United States Patent [19]

Asai

[11] Patent Number: 4,703,503

[45] Date of Patent: Oct. 27, 1987

[54] CRYPTOGRAPHIC SYSTEM USING PSEUDOCOMPLEMENTS OF VECTOR BOOLEAN ALGEBRA

[76] Inventor: Hitohisa Asai, 892 Catalina Dr., Newport News, Va. 23602

[21] Appl. No.: 915,234

[22] Filed: Oct. 3, 1986

[51] Int. Cl.$^4$ .............................................. H04L 9/04
[52] U.S. Cl. ...................................... 380/28; 380/23; 380/44
[58] Field of Search ....................... 380/22, 23, 25, 28, 380/30, 44, 46

[56] References Cited

U.S. PATENT DOCUMENTS

| | | | |
|---|---|---|---|
| 4,399,323 | 8/1983 | Henry | 380/30 |
| 4,405,829 | 9/1983 | Rivest et al. | 380/30 |
| 4,408,093 | 10/1983 | Place | 380/22 |
| 4,424,414 | 1/1984 | Hellman et al. | 380/30 |
| 4,431,865 | 2/1985 | Bernede et al. | 380/44 |

OTHER PUBLICATIONS

"Cryptology", Chpt. 23 (pp. 295–302), Algorithms (1983), Addison–Wesley, Sedgewick.
"Probabilistic Encryption", J. Comp. & Syst. Sci., vol. 88, pp. 270–299 (1984), Goldwasser et al.

Primary Examiner—Salvatore Cangialosi

[57] ABSTRACT

By using properties of pseudocomplements of vector Boolean algebra defined herein, a vector Boolean value which represents a plaintext of a message is converted to an enciphered text. The enciphered text consists of a pair of conjugate pseudocomplements of the plaintext with respect to a parameter which is a cipher key. In the deciphering process, the pair of the conjugate pseudocomplements is needed to recover the original plaintext. When a higher degree of message security is desired, both parties (a sender and a receiver) of a communication can establish two parameters (s,p) rather than one, and the sender can encipher a plaintext M into a pair of conjugate pseudocomplements $(C_1, C_2)$ derived independently from the parameters where p is a pseudocomplement of a key c with respect to s. The derived conjugate pseudocomplements are $C_1 = T_s^*(M)$ and $C_2 = T_p^+(M)$ where $T_s^*$ and $T_p^+$ represent the transformations of pseudocomplementing operations with respect to its suffixed parameters. The receiver performs a pseudocomplementing operation with respect to c on $C_1$, namely $T_c^+(C_1) = T_c^+(T_s^*(M)) = T_p^*(M)$ and recovers the original message M by deciphering $T_p^*(M)$ and $T_p^+(M)$ with respect to p. An advantage of this method is an increase of information entropy in each enciphered pseudocomplement over the one in a plaintext. Another advantage is an increase of the message length of an enciphered text. The first advantage can be applied to quickly establish a transient cipher key between a sender and a receiver through an insecure communication medium. The second advantage can strengthen a combinational complexity in an enciphered text so that in cryptanalysis, a decryption of the enciphered text becomes more difficult. Furthermore, when the two keys used in this system are enciphered by the third key, the decipher key used is different from its corresponding encipher key and is difficult to retrieve from the encipher key, which may be announced to general public. Thus this system becomes a public key system.

18 Claims, 7 Drawing Figures

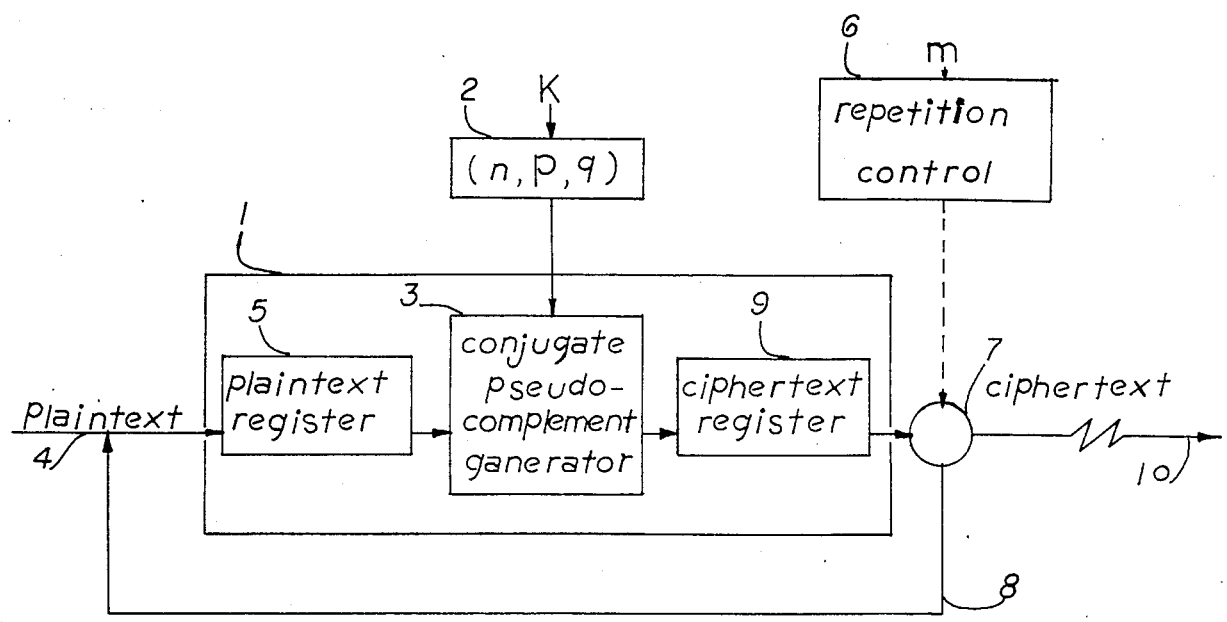
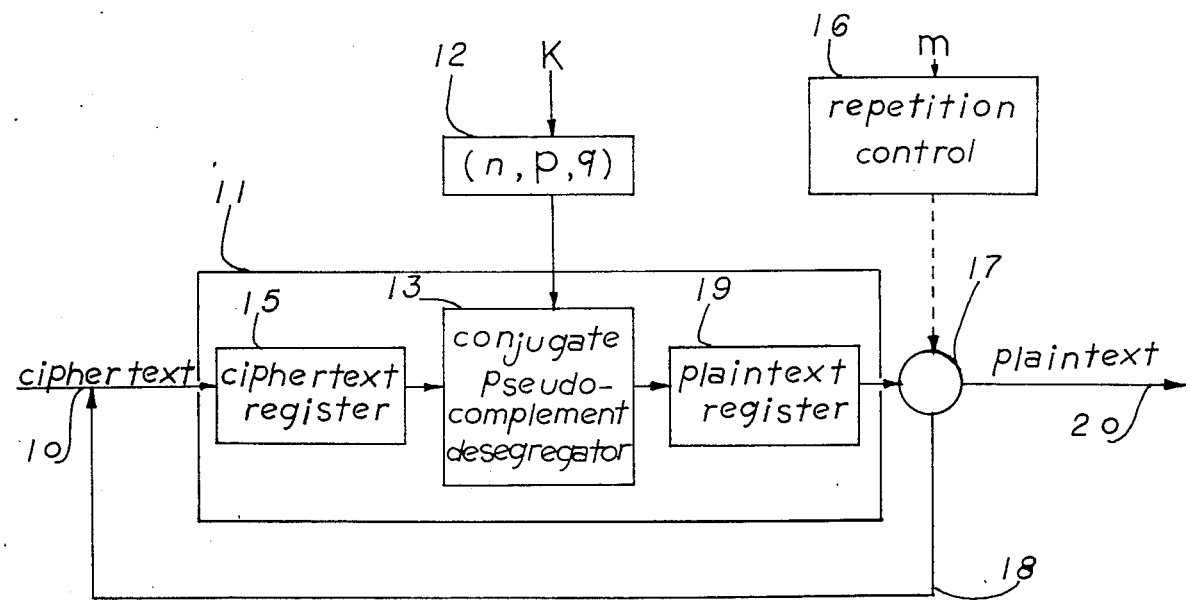
FIG. 2

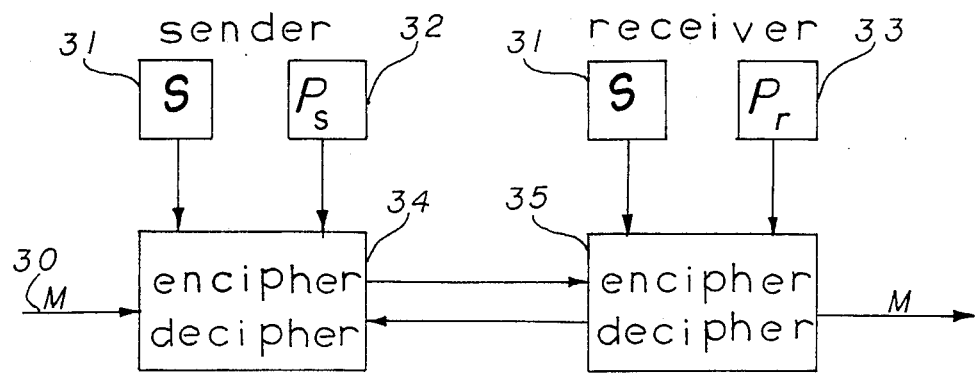

STEP 1 sender generates a conjugate pseudocomplements of $P_s$ with respect to S and sends one component of the conjugate pseudocomplements.

$C_s = T_S(P_s)$ receiver does not recover $P_s$ because of a single pseudocomplement of $P_s$.

STEP 2 he has received the pair of the pseudocomplements and retrieves the parameter $P_r$ from $C_{r1}$ and $C_{r2}$ by $P_r = T_{cs}^{-1}(C_{r1}, C_{r2})$ where $C_{r2} = T_{ps}(C_{rs}) = T_{ps}(T_S(P_r)) = T_{ps \times S}(P_r)$.

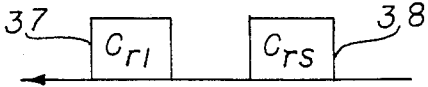

he generates a pair of conjugate pseudocomplements with respect to S and $C_s$ by $C_{r1} = T_{cs}(P_r)$ and $C_{rs} = T_S(P_r)$ and sends these.

STEP 3 he enciphers a plaintext M using the parameter $P_r$ to generate the ciphertext C of M and sends it.

$C = T_{Pr}(M)$ he receives C and deciphers C to recover M using the parameter $P_r$.

REMARK  S: system's parameter, $P_s$: sender's parameter, $P_r$: receiver's parameter.

FIG. 3

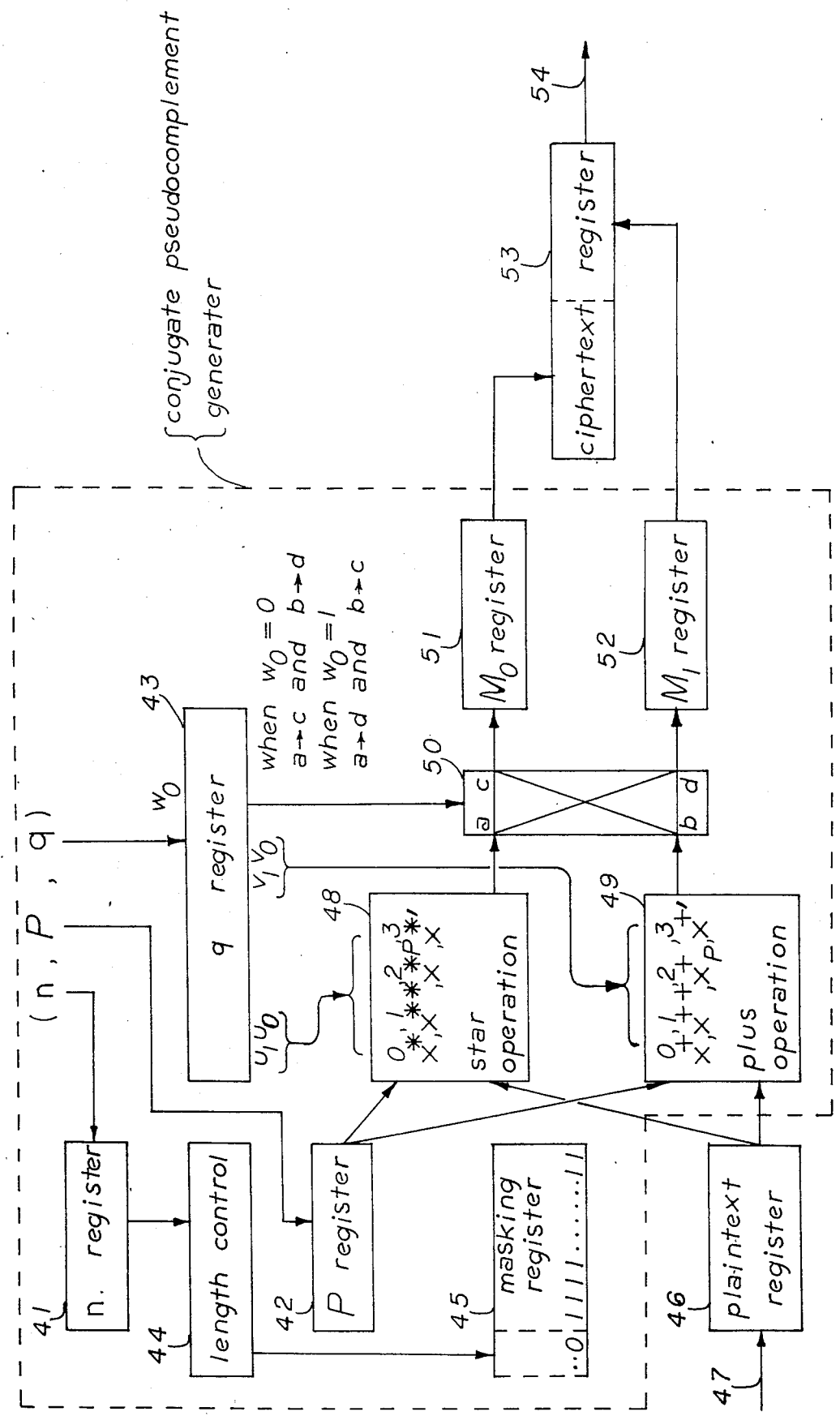
F I G. 4

CRYPTOGRAPHIC SYSTEM USING PSEUDOCOMPLEMENTS OF VECTOR BOOLEAN ALGEBRA

BACKGROUND OF THE INVENTION

This invention relates to a cryptographic system for enciphering and deciphering a digital signal conveying messages in data transmission networks. It is often necessary to protect stored and transmitted data from unauthorized parties or eavesdroppers. Cryptography offers the protection necessary for data privacy. However, as the required amount of privacy increases, the processing time for enciphering and deciphering a plaintext lengthens due to an increased complexity of the cryptography. It is desirable to have a simpler and faster cryptographic process and to provide a higher secrecy of data.

DESCRIPTION OF PRIOR ART

In the prior art, there are many cryptographic encipher/decipher techniques which are readily available to protect, to some degree, the secrecy of the stored and transmitted data. An example is the data encryption standard adopted by the National Bureau of Standards. See *Federal Register*, Mar. 17, 1975, Volume 40, No. 52 and Aug. 1, 1975, Volume 40, No. 149.

In general, cryptographic systems have three main components: (i) enciphering unit which transforms, by a mathematical one-to-one mapping, a plaintext and an encipher key(s) to a corresponding unintelligible ciphertext; (ii) an insecure medium for the storage or transmission of the ciphertext; (iii) deciphering unit which recovers the imbedded plaintext from the ciphertext by an inverse one-to-one mathematical mapping. This system includes at least two necessary parties utilizing the enciphering unit and the deciphering unit. These two parties are generally called the sender of the message and the authorized receiver of the message. A possible third party is generally referred as an unauthorized eavesdropper.

When the sender wants to secure his plaintext from the third party during transmission or storage, he can use enciphering unit using an enciphering key(s). An authorized receiver, who may be the sender, can retrieve the plaintext from the ciphertext in the medium by utilizing a deciphering key(s) on the deciphering unit. In an ideal situation, an eavesdropper trying to recover the plaintext from a ciphertext without knowing the deciphering key(s) will find the recovery computationally infeasible.

The effectiveness of a cryptographic system to protect against an attack by an eavesdropper depends on the computational complexity of the enciphering and deciphering processes and the sizes of the mathematical domains applicable to these processes. In other words, the effectiveness depends upon the capability to ensure that the eavesdropper is unable to decode any such ciphertexts. The sender and receiver arrange to have corresponding enciphering and deciphering keys which are kept secret from the eavesdropper, so that even if the eavesdropper knows the computational processes of the enciphering unit and the deciphering unit, he would not be able to decrypt the ciphertexts. A task is considered computationally infeasible if its cost, as measured by either the amount of memory used or the computing time, is finite but impractically large, for example 100 years computing time.

A byte is a string of n-bits, a word is a segment of m-bytes, a message to encipher or to decipher is a block of t-words, and a plaintext is a collection of messages. Since the enciphering and deciphering processes directed by a pair of chosen enciphering and deciphering keys are mathematically one-to-one mappings from plaintext-message domain to ciphertext-message domain and vice versa, the effectiveness of a cryptographic system can generally be measured by the computational complexity of the mapping functions (including the domain size of the keys) and the ratio of the size of the subdomain containing all meaningful messages over the size of the entire message domain. For example, when one considers twenty-six roman letters (bytes) and a blank letter (space) and words composed of five letters or less, the domain size of the words is $27 \times 27 \times 27 \times 27 \times 27 = 14348907$ because there are twenty-seven choices for each byte (a letter) in the five letter-window. The size of the subdomain of all meaningful words of which the length of the words in English is less than six letters is much smaller than the domain 14348907.

SUMMARY OF THE INVENTION

An object of the present invention is to provide a cryptographic system which performs a simpler and faster process of an enciphering and deciphering computation based on pseudocomplements of vector-Boolean algebra described herein.

Another object of the present invention is to provide a cryptographic system which encodes a plaintext into a $2^m$-time longer ciphertext (m is greater than or equal to one) than the length of the plaintext and which decodes the ciphertext into the original plaintext. The longer ciphertext implies that an eavesdropper requires a larger domain of ciphertexts in order to retrieve the plaintext.

Another object of the present invention is to enable an enlargement of information entropy in a ciphertext to increase the difficulty of the deciphering process employed by an eavesdropper.

Another object of the present invention is to quickly and safely replace a cipher key through an insecure communication medium.

Another object of the present invention is to strengthen a combinational complexity in a ciphertext by a factor of a factorial operation when another cryptography (for example DES of National Bureau of Standard) is additionally used.

BRIEF DESCRIPTION OF THE DRAWINGS

FIG. 2 is a block diagram of a cryptographic system having a conjugate pseudocomplement generator for enciphering and a conjugate pseudocomplement desegregator for deciphering in accordance with the present invention.

FIG. 3 is a chart illustrating a procedure to quickly and safely establish a transient key through an insecure communication medium in accordance with the present invention.

FIG. 4 is a block diagram of a conjugate pseudocomplement generator of an enciphering device.

DETAILED DESCRIPTION

Figure 1:
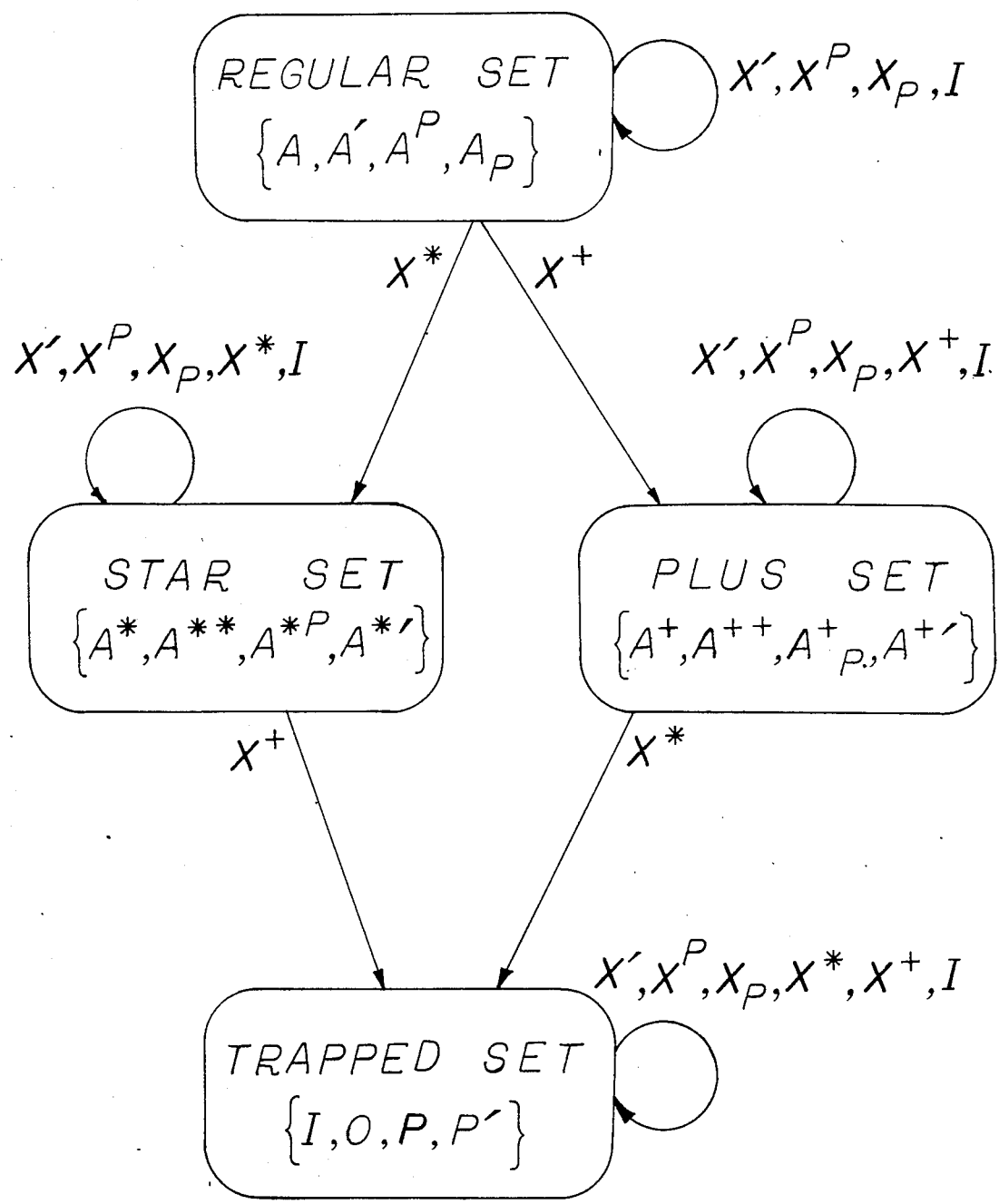
FIG. 1 is a state transition diagram from regular set $\{A, A', A^P, A_p\}$ to star set $\{A^*, A^{**}, A^{*P}, A^{*'}\}$ or to plus set $\{A^+, A^{++}, A^+_P, A^{+'}\}$ and from star set and plus set to trapped set $\{I, O, P, P'\}$. Remark: The passages from the regular set to the trapped set are one-way paths through two conjugate pseudocomplementing operations.

A Boolean algebra consisting of exactly $2^n$ elements for some integer n is represented by $f(x_1, x_2, \ldots, x_n)$: mapping from n-product space of b to b, namely $b \times b \ldots \times b \rightarrow b = \{0,1\}$ and $x_i$ for $i = 1, 2, \ldots, n$ is a two-valued variable of b. The $2^n$ elements can be denoted by binary vector forms having n components. Using such a notation, we execute the operations, join, meet and complement-negation, of the Boolean algebra componentwise by considering each component in a vector form as an independent two-valued element of Boolean algebra. In a vector form, the notation of the zero element and the unity element are $O = OO \ldots O$ and $I = 11 \ldots 1$, respectively.

In the vector form of a variable X, the classic complement (negation) $X'$ of X is defined under join and meet operations, i.e., $X + X' = I$ and $X \cdot X' = O$. By utilizing exclusive-OR, $X^P = X'P + XP'$, or coincidence, $X_P = XP + X'P'$, operations with respect to a parameter P, $X^P$ or $X_P$ may be considered as relative complements of a variable X. Since $X + X^P = X + P$ and $X \cdot X^P = X \cdot P'$ or $X + X_P = X + P'$ and $X \cdot X_P = X \cdot P$, both become I and O when $P = I$ or $P' = I$ under exclusive-OR and coincidence operations respectively. In contrast, when $P = O$ or $P' = O$, the relative complements results in $X + X^P = X + P = X$ and $X \cdot X^P = XP' = X$ for exclusive-OR operation, and $X + X_P = X + P' = X$ and $X \cdot X_P = XP = X$ for coincidence operation. Because of the exchangeability (described later) between X, $X'$, $X^P$ and $X_P$ under these operations, these complements are called regular complements.

From a view point of information theory introduced by C. E. Shannon, a variable X in the vector form can carry a certain information. Similarly, $X'$, $X^P$ and $X_P$ can carry the same information as X after repeating its respectively applied operation twice, i.e., $(X')' = X$, $(X^P)^P = X$ and $(X_p)_p = X$. In other words, information entropy carried by X, $X'$, $X^P$ and $X_P$ is the same under these reciprocative operations. The information entropy is defined by $$H = -\sum_{i=1}^{n} p_i \cdot \lg p_i \quad (1)$$

where $p_i$ and lg denote a probability of the $i^{th}$ event among $2^n$ possible events (values) and logarithm with base 2, i.e., $\log_2$, respectively.

An increase of the information entropy in a variable indicates a magnification of vaguenesses of the context in X. In order to magnify the information entropy of an enciphered text, pseudocomplements $X^*$ and $X^+$ are introduced by defining $X + X^* = I$, $X \cdot X^* = XP \leq P$, and $P \leq X + X^+ = X + P$, $X \cdot X^+ = O$, respectively where P is a parameter. From this definition, one can determine $X^* = X' + P$ and $X^+ = X' \cdot P$. Moreover, the pseudocomplementing operations $X^*$ and $X^+$ are one-way operations to $X^*$ and $X^+$ from X, $X'$, $X^P$ and $X_P$. In other words, there are no Boolearn operations to map from $X^*$ and $X^+$ to X, $X'$, $X^P$ and $X_P$, namely $X^*$ and $X^+$ operations are irreversible (magnification of the entropy). Table 1 illustrates the result of an operation applied on an argument A. For example, by choosing an operation from $X^+$, $X^P$, $X'$, $X_P$, $X^*$ and I in the top row, and an argument in the left column of table 1, the intersection of the column of the operation and the row of the argument displays the result of this operation on the argument. When an operation and an argument chosen are $X^*$ and $A_P$ respectively, the result $A^{**}$ of the operation $X^*$ on $A_P$ is found at the intersection of the column of $X^*$ and the row of $A_P$.

Considering repeated applications of operations on an argument, one can find a successive result of the applications from table 1. The transitiveness of successive applications of operations are depicted in FIG. 1 which shows (i) four distinct sets: regular set, star set, plus set and trapped set, and (ii) irreversible courses of the $X^*$ and $X^+$ operations from the regular set to the star and plus sets and then from these two sets to the trapped set.

Since the defined pseudocomplement of a variable A associates with a parameter P, the pseudocomplement with respect to the parameter must be denoted with the P. The notation -(-P-)- is used after a pseudocomplement symbol to denote the respected parameter P. For example, $X^*$ and $X^+$ with respect to the parameter P are now $X^*$-(-P-)- and $X^+$-(-P-)-. However, when a pseudocomplementation involves a single parameter then the pseudocomplement will be abbreviated by omitting the parameter notation -(-P-)-, otherwise, parameter notations indicate the pseudocomplements with respect to each parameter. For example, operations $X^*$ and $X^P$ applied on A with respect to $P_1$ and $X^+$ and $X'$ applied on the subsequent result with respect to $P_2$ result in $(A^{*P}\text{-}(\text{-}P_1\text{-})\text{-})^{+\prime}\text{-}(\text{-}P_2\text{-})\text{-}$.

TABLE 1

| Arguments | Operations | | | | | |
|---|---|---|---|---|---|---|
|  | $X^+$ | $X_P$ | $X'$ | $X^P$ | $X^*$ | I |
| $A^+$ | $A^{++}$ | $A^+{}_P$ | $A^+$ | $A^{++}$ | I | $A^+$ |
| $A^{++}$ | $A^+$ | $A^{+\prime}$ | $A^+{}_P$ | $A^+$ | I | $A^{++}$ |
| $A^{*\prime}$ | P | $A^{*P}$ | $A^*$ | $A^{**}$ | $A^*$ | $A^{*\prime}$ |
| $A^{*P}$ | P | $A^{*\prime}$ | $A^{**}$ | $A^*$ | $A^{**}$ | $A^{*P}$ |
| A | $A^+$ | $A_P$ | $A'$ | $A^P$ | $A^*$ | A |
| $A'$ | $A^{++}$ | $A^P$ | A | $A_P$ | $A^{**}$ | $A'$ |
| $A^P$ | $A^{++}$ | $A'$ | $A_P$ | A | $A^*$ | $A^P$ |
| $A_P$ | $A^+$ | A | $A^P$ | $A'$ | $A^{**}$ | $A_P$ |
| $A^{+\prime}$ | $A^+$ | $A^{++}$ | $A^+$ | $A^+{}_P$ | P | $A^{+\prime}$ |
| $A^+{}_P$ | $A^{++}$ | $A^+$ | $A^{++}$ | $A^{+\prime}$ | P | $A^+{}_P$ |
| $A^*$ | O | $A^{**}$ | $A^{*\prime}$ | $A^{*P}$ | $A^{**}$ | $A^*$ |
| $A^{**}$ | O | $A^*$ | $A^{*P}$ | $A^{*\prime}$ | $A^*$ | $A^{**}$ |

INFORMATION ENTROPY OF PSEUDOCOMPLEMENTS

An increase of information entropy in pseudocomplements is computed as follows: For $X^*$ operation, there are $$\binom{n}{n-i} \quad (= n!/(i!(n-i)!))$$

terms indicating the number of choices of pseudocomplements defined by a parameter $p_i$ which consists of i ones and (n−i) zeros in its vector form. These i ones in a pseudocomplement can mask i-bits among n-bits of a plaintext so that there are $2^i$ varieties of the maskings. Therefore the sum:

$$\sum_{i=0}^{n} \binom{n}{i} 2^i = 3/2^n = 2^{n(\lg 3-)}$$

represents the total message capacity of n-bits in a vector form with $p_i$. Thus, the entropy is $$h_p = \sum_{i=1}^{3^n} (-1/2^{n(\lg 3)}) \lg 2^{-n(\lg 3)} =$$

$$(n(\lg 3)/2^{n(\lg 3)})2^{n(\lg 3)} = n(\lg 3)$$

which is larger than the entropy $$h = \sum_{i=1}^{3^n} (-1/2^n) \lg 2^{-n} = (n/2^n)2^n = n$$

without the $p_i$. An increase of the entropy is signified by the ratio R, $$R = n(\lg 3)/n = \lg 3 = 1.58496\ldots$$

where uniform distributions of the events are assumed. For X+ operation, the same result is obtained.

RECOVERY A PLAINTEXT A FROM ITS TWO PSEUDOCOMPLEMENTS THAT CONSTITUTE A CONJUGATE PAIR

FIG. 1 illustrates the transition of pseudocomplements from the regular set to the trapped set by applying the pseudocomplementing operations X* and X+. There are four elements in the star set and four in the plus set which are derived from regular set elements. Since entropies of these eight elements have been increased, one cannot retrieve an element of the regular set from an element of these pseudocomplement sets. However, from the duality of Boolean algebra, a conjugate relationship between a star set element and a plus set element exists due to conjugate operations of join and meet. Therefore, one can recover an element of the regular set from a pair of conjugate pseudocomplements as follows:

$$A = A^{++} + A^{*'} = A^{+'} \cdot A^{**} \quad (2\text{-}1)$$

$$A' = A^+ + A^{*P} = A^+ {}_P \cdot A^* \quad (2\text{-}2)$$

$$A^P = A^+ + A^{*'} = A^+ \cdot A^{**} \quad (2\text{-}3)$$

$$A_P = A^{++} + A^{*P} = A^{+'} \cdot A^* \quad (2\text{-}4)$$

ENCIPHERING AND DECIPHERING PROCESS USING A SINGLE PARAMETER

An encipher/decipher key K(n,P,q) consists of three components: (1) n=block size of a plaintext, (2) P=pseudocomplement parameter which masks the plaintext and (3) q=combinational identifier of a conjugate pair of pseudocomplements. FIG. 2 despicts the process of enciphering/deciphering a plaintext. A plaintext A and a key K are supplied to the input port 4 of the enciphering unit 1 and the key register 2, respectively. The three components of the key are transmitted to the conjugate pseudocomplement generator 3. Then the plaintext is transformed mathematically into a conjugate pair of pseudocomplements, $(C_1,C_2) = T_K(A)$ by generator 3, and is stored in the ciphertext register 9. The content of the ciphertext register is transmitted to an authorized receiver through the communication line or medium 10 which is connected to an input port of the deciphering unit 11. If a repetition m is greater than one then the repetition control 6 shall control the looping operation of the enciphering through node 7 and the feedback line 8 until the number of repetitions is satisfied.

The authorized receiver who keeps key K in the key register 12 of the deciphering unit 11 shall exercise a reverse course of the enciphering process. The received ciphertext $(C_1,C_2)$ in the ciphertext register 15 is converted into the plaintext by the conjugate pseudocomplement desegregator 13 using key K. The deciphered text which is the original plaintext appears at the plaintext register 19. When the repetition constant m is greater than one, the repetition control 16 shall perform the repeated loop-operation of the deciphering process through node 17 and the feedback path 18 until the specified looping is accomplished. The retrieved plaintext is sent out from the output port 20.

ESTABLISHMENT OF A TRANSIENT CIPHER KEY BETWEEN SENDER AND RECEIVER

Before a sender sends a message to an authorized receiver, both parties must know the transient encipher/decipher key. FIG. 3 illustrates a process to establish such a key between the sender and the authorized receiver. An encipher/decipher key S stored in the register 31 is distributed to all authorized users of the cryptographic system. Also assume that an eavesdropper gets the key S. A sender initiates an inquiry to establish with an authorized receiver a transient key by sending a pseudocomplement $C_s = T_S(P_s)$ in box 36 of a parameter $P_s$ stored in register 32 using the system key S where $T_S$ denotes a transformation. Remark: The sent inquiry consisting of half of a conjugate pair $P_s$ is lengthened fully to 2n with padding bits.

The receiver does not decipher the received pseudocomplement $C_s$ but he shall use the $C_s$ as a parameter for his sending message, i.,e., transient encipher/decipher key $P_r$ stored in register 33. The eavesdropper encounters difficulty in deciphering $P_s$ from the $C_s$ because of the missing half of the conjugate pair $P_s$ and of a larger entropy of $C_s$. The receiver generates a conjugate pair, consisting of two components: (1) $C_{r1} = T_{Cs}(P_r)$ indicated in box 37 and (2) $C_{rs} = T_S(P_r)$ indicated in box 38 of the $P_r$ using two parameters $C_s$ and S, respectively and transmits these to the sender.

The sender who has the parameters $C_s$ and $P_s$ receives the pair, $C_{r1}$ and $C_{rs}$. Then, he generates the other conjugate pseudocomplement $C_{r2}$ of the $P_r$ by $C_{r2} = T_{Ps}(C_{rs}) = T_{Ps}(T_S(P_r)) = T_{PsxS}(P_r) = T_{Cs}(P_r)$ using eq.s (3) and (4) below and deciphers the $P_r$ from the conjugate pair of $C_{r1}$ and $C_{r2}$ with respect to the parameter $C_s$ by $P_r = T_{Cs}(C_{r1}, C_{r2})$ using eq.s (2) where PsxS denotes $C_s = T_S(P_s)$.

$$\begin{array}{llll}
(A^+{}_P\text{-}(P_j)\text{-})^{+'}\text{-}(P_j)\text{-} & = (A^{++}\text{-}(P_j)\text{-})^+{}_P\text{-}(P_j)\text{-} & = A^+{}_P\text{-}(P_i{}^{++}\text{-}(P_j)\text{-})\text{-} & = A^*\text{-}(P_i{}^+{}_P\text{-}(P_j)\text{-})\text{-} & (3\text{-}1) \\
(A^+{}_P\text{-}(P_j)\text{-})^{**}\text{-}(P_j)\text{-} & = (A^{++}\text{-}(P_j)\text{-})^*\text{-}(P_j)\text{-} & = A^+{}_P\text{-}(P_i{}^{*'}\text{-}(P_j)\text{-})\text{-} & = A^*\text{-}(P_i{}^*\text{-}(P_j)\text{-})\text{-} & (3\text{-}2) \\
(A^*\text{-}(P_j)\text{-})^{+'}\text{-}(P_j)\text{-} & = (A^{*'}\text{-}(P_j)\text{-})^+{}_P\text{-}(P_j)\text{-} & = A^+{}_P\text{-}(P_i{}^+\text{-}(P_j)\text{-})\text{-} & = A^*\text{-}(P_i{}^{+'}\text{-}(P_j)\text{-})\text{-} & (3\text{-}3)
\end{array}$$

-continued

| | | | | |
|---|---|---|---|---|
| $(A^{*}-(P_i)-)^{**}-(P_j)-$ | $= (A^{*'}-(P_i)-)^{*}-(P_j)-$ | $= A^{+}{}_{P}-(P_i*^{P}-(P_j)-)-$ | $= A^{*}-(P_i^{**}-(P_j)-)-$ | (3-4) |
| $(A^{+'}-(P_i)-)^{+'}-(P_j)-$ | $= (A^{+}-(P_i)-)^{+}{}_{P}-(P_j)-$ | $= A^{+'}-(P_i^{+}+{-}(P_j)-)-$ | $= A^{**}-(P_i^{+}{}_{P}-(P_j)-)-$ | (3-5) |
| $(A^{+'}-(P_i)-)^{**}-(P_j)-$ | $= (A^{+}-(P_i)-)^{*}-(P_j)-$ | $= A^{+'}-(P_i^{*'}-(P_j)-)-$ | $= A^{**}-(P_i^{*}-(P_j)-)-$ | (3-6) |
| $(A^{**}-(P_i)-)^{+'}-(P_j)-$ | $= (A^{*P}-(P_i)-)^{+}{}_{P}-(P_j)-$ | $= A^{+'}-(P_i^{+}-(P_j)-)-$ | $= A^{**}-(P_i^{+'}-(P_j)-)-$ | (3-7) |
| $(A^{}-(P_i)-)^{}-(P_j)-$ | $= (A^{*P}-(P_i)-)^{*}-(P_j)-$ | $= A^{+'}-(P_i^{*P}-(P_j)-)-$ | $= A^{}-(P_i^{}-(P_j)-)-$ | (3-8) |
| $(A^{*P}-(P_i)-)^{*'}-(P_j)-$ | $= (A^{**}-(P_i)-)^{*P}-(P_j)-$ | $= A^{+}-(P_i*^{P}-(P_j)-)-$ | $= A^{*P}-(P_i^{**}-(P_j)-)-$ | (3-9) |
| $(A^{*P}-(P_i)-)^{++}-(P_j)-$ | $= (A^{**}-(P_i)-)^{+}-(P_j)-$ | $= A^{+}-(P_i^{+}-(P_j)-)-$ | $= A^{*P}-(P_i^{+'}-(P_j)-)-$ | (3-10) |
| $(A^{+}-(P_i)-)^{*'}-(P_j)-$ | $= (A^{+'}-(P_i)-)^{*P}-(P_j)-$ | $= A^{+}-(P_i^{*'}-(P_j)-)-$ | $= A^{*P}-(P_i^{*}-(P_j)-)-$ | (3-11) |
| $(A^{+}-(P_i)-)^{++}-(P_j)-$ | $= (A^{+'}-(P_i)-)^{+}-(P_j)-$ | $= A^{+}-(P_i^{+}+{-}(P_j)-)-$ | $= A^{*P}-(P_i^{+}{}_{P}-(P_j)-)-$ | (3-12) |
| $(A^{*'}-(P_i)-)^{*'}-(P_j)-$ | $= (A^{*}-(P_i)-)^{*P}-(P_j)-$ | $= A^{++}-(P_i*^{P}-(P_j)-)-$ | $= A^{*'}-(P_i^{**}-(P_j)-)-$ | (3-13) |
| $(A^{*'}-(P_i)-)^{++}-(P_j)-$ | $= (A^{*}-(P_i)-)^{+}-(P_j)-$ | $= A^{++}-(P_i^{+'}-(P_j)-)-$ | $= A^{*'}-(P_i^{+'}-(P_j)-)-$ | (3-14) |
| $(A^{++}-(P_i)-)^{*'}-(P_j)-$ | $= (A^{+}{}_{P}-(P_i)-)^{*P}-(P_j)-$ | $= A^{++}-(P_i^{*'}-(P_j)-)-$ | $= A^{*'}-(P_i^{*}-(P_j)-)-$ | (3-15) |
| $(A^{++}-(P_i)-)^{++}-(P_j)-$ | $= (A^{+}{}_{P}-(P_i)-)^{+}-(P_j)-$ | $= A^{++}-(P_i^{+}+{-}(P_j)-)-$ | $= A^{*'}-(P_i^{+}{}_{P}-(P_j)-)-$ | (3-16) |

Also the following relationships exist.

| | |
|---|---|
| $A^{+}-(P)- = P^{*'}-(A)-$ | (4-1) |
| $A^{*}-(P)- = P^{+'}-(A)-$ | (4-2) |
| $A^{+'}-(P)- = P^{*}-(A)-$ | (4-3) |
| $A^{*'}-(P)- = P^{+}-(A)-$ | (4-4) |
| $A^{++}-(P)- = P^{++}-(A)-$ | (4-5) |
| $A^{}-(P)- = P^{}-(A)-$ | (4-6) |
| $A^{*P}-(P)- = P^{*P}-(A)-$ | (4-7) |
| $A^{+}{}_{P}-(P)- = P^{+}{}_{P}-(A)-$ | (4-8) |
| $A^{P}-(P)- = P^{P}-(A)-$ | (4-9) |
| $A_{P}-(P)- = P_{P}-(A)-$ | (4-10) |
| $A^{+}-(P')- = A^{*P}-(P)-$ | (5-1) |
| $A^{*}-(P')- = A^{+}{}_{P}-(P)-$ | (5-2) |
| $A^{++}-(P')- = A^{*'}-(P)-$ | (5-3) |
| $A^{**}-(P')- = A^{+'}-(P)-$ | (5-4) |
| $A_{P}-(P')- = A^{P}-(P)-$ | (5-5) |

In general, the eavesdropper knows $C_s$ and $S$ but not $P_s$ when deciphering $P_r$ from the intercepted $C_{r1}$ and $C_{rs}$. The difficulty in retrieving $P_r$ from $C_{r1}$ and $C_{rs}$ arises because (i) they are derived from two independent parameters $C_s$ and $S$, and (ii) the halves of the conjugate pairs $P_r$ with respect to $C_s$ and $S$ are missing. A similar difficulty occurs in retrieving $C_{r2}$ from $C_{rs}$ because the eavesdropper generally does not know $P_s$.

After the sender deciphers $P_r$, both the parties now have the transient key $P_r$. The sender can encipher a plaintext and can send the ciphertext indicated in box 39 to the receiver who is able to decipher it.

In FIG. 4 which illustrates the enciphering process, the three components (n,P,q) of a key are stored in the n register 41, the P register 42 and the q register 43, respectively. The length control 44 generates a row of n ones in the masking register 45 from the n of the key. Logical AND operation masks the P register 42 and the plaintext register 46 using the n ones generated. The content of the P register 42 is the parameter P for enciphering a plaintext.

The third component q of the key in the q register 43 denotes the pseudocomplementing operation applied on a plaintext to produce the ciphertext.

A pseudocomplement in the star set $\{A^{*}, A^{**}, A^{*P}, A^{*'}\}$ can be coded with 2 bits $u_1 u_0$ taking on corresponding binary values 00 (=0), 01 (=1), 10 (=2) and 11 (=3), respectively. Similarly, a pseudocomplement in the plus set $\{A^{+}, A^{++}, A^{+}{}_{P}, A^{+'}\}$ is coded with $v_1 v_0$ bits. The bits $u_1 u_0$ and $v_1 v_0$ are components of the q. For example, $A^{*P}$ and $A^{+'}$ are coded as $u_1 u_0 = 10 (=2)$ and $v_1 v_0 = 11 (=3)$. Further a single bit $w_0$ of the q indicates the order of the two pseudocomplements of a conjugate pair in a ciphertext. When this bit is on (=1) or off (=0), it may express the plus-star sequence or the star-plus sequence in a ciphertext.

After a block of plaintext is loaded in the plaintext register 46 through the input port 47, the block is enciphered by the star operation 48 and the plus operation 49 using the bits $w_0$, $u_1 u_0$ and $v_1 v_0$ of the q register 43. The bits $u_1 u_0$ and $v_1 v_0$ designate the star pseudocomplement operation of $\{X^{*}, X^{**}, X^{*P}, X^{*'}\}$ and the plus pseudocomplement operation of $\{X^{+}, X^{++}, X^{+}{}_{P}, X^{+'}\}$ to apply on the content of the plaintext register using the parameter P in the P register. The two pseudocomplements, produced by the star operation and by the plus operation using the bits $u_1 u_0$ and $v_1 v_0$, are transmitted to the $M_0$ register 51 and the $M_1$ register 52 through switch 50 dictated by bit $w_0$ where a,b terminals are connected to c,d terminals if $w_0 = 0$ (off) or to d,c terminals, if $w_0 = 1$ (on). Then a ciphertext is dispatched to the output port 54 after concatenating the contents of the registers $M_1$ and $M_0$. The $M_1$ content is placed in the right half of the ciphertext and the $M_0$ content in the left half.

Figure 5:
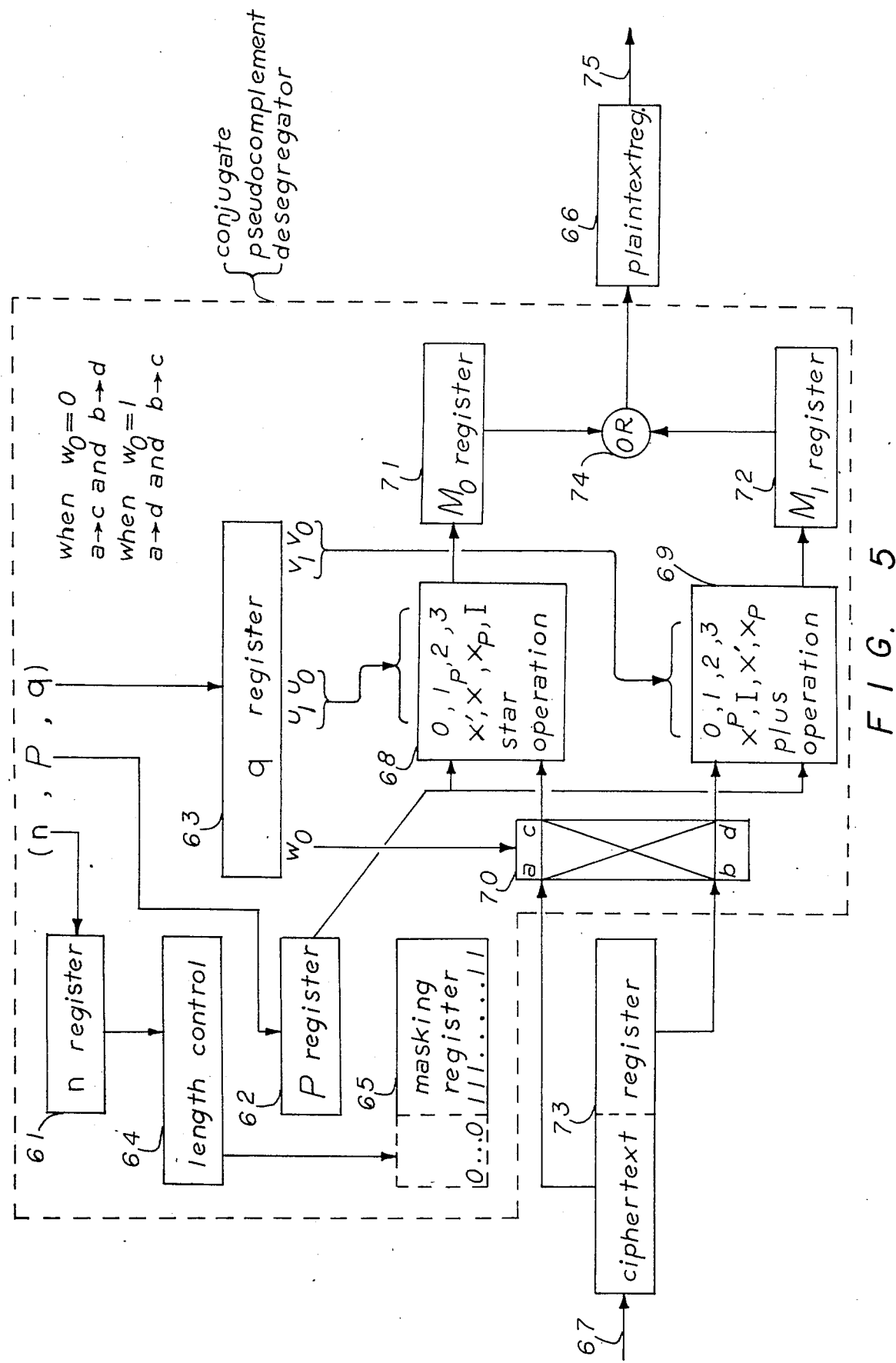
FIG. 5 is a block diagram of a conjugate pseudocomplement desegregator of a deciphering device.

In FIG. 5 which illustrates the deciphering process using OR version of eq. (2-1), the three components (n,P,q) of a key are stored in the n register 61, the P register 62, and the q register 63, respectively. The length control 64 generates a row of n ones in the masking register 65 from the n component of the key. Logical AND operation masks the P register 62 and the ciphertext register 73 using the n ones generated.

The third component q, consisting of the bits $w_0$, $u_1 u_0$ and $v_1 v_0$, of the key in the q register 63 is used in the deciphering process. After a ciphertext is loaded in the ciphertext register 73 through the input port 67, the left half and the right half of the ciphertext are forwarded to the star operation 68 and the plus operation 69 respectively through switch 70 where the switching position depends upon bit $w_0$ in the q register. The bits $u_1 u_0$ and $v_1 v_0$ in the q register 63, connected directly to the star operation 68 and the plus operation 69 respectively, select one of the operations $\{X', X^P, X_P, I\}$ and one of the operations $\{X^P, I, X', X_P\}$. The respective operations applied on the star pseudocomplement and the plus pseudocomplement of the ciphertext produce $A^{*'}$ and $A^{++}$, respectively. The $A^{*'}$ and $A^{++}$ generated by these operations are stored in registers $M_0$ 71 and $M_1$ 72, respectively. Then the contents of the registers $M_1$ and $M_0$ are joined by logical OR operation 74, and the result of the OR operation is forwarded to the plaintext register 66 and dispatched through the output port 75.

Similarly, one can arrange another deciphering process like the one in FIG. 5 using the other equation in eq.s (2). For example, when using the AND version of eq. (2-1) in order to obtain the quantity A, one can determine by referncing table 1 the process required to transform the star pseudocomplement in a ciphertext (designated by the $u_1 u_0$ in the q component) into the term $A^{**}$ that appears in eq. (2-1) and also the process required to transform the plus pseudocomplement in the ciphertext (designated by the $v_1v_0$ in the q component) into the term $A^+$, that appears in eq. (2-1). The found processes are as follows: The transformation from a star pseudocomplement of set $\{A^*$ (when $u_1u_0=00$), $A^{**}$ (when $u_1u_0=01$), $A^{*P}$ (when $u_1u_0=10$), $A^{*\prime}$ (when $u_1u_0=11$)$\}$ to $A^{}$ can be accomplished by applying a respective operation of set $\{X_P, I, X', X^P\}$ on it, and the transformation from a plus pseudocomplement of set $\{A^+$ (when $v_1v_0=00$), $A^{++}$ (when $v_1v_0=01$), $A^+{}_P$ (when $v_1v_0=10$), $A^{+\prime}$ (when $v_1v_0=11$)$\}$ to $A^{+\prime}$ can be accomplished by applying a respective operation of set $\{X', X_P, X^P, I\}$. Thus an AND operation on the terms $A^{}$ and $A^{+\prime}$ results in the quantity $A$ which represents the plaintext as shown in eq. (2-1).

A DETAILED EXAMPLE OF AN ESTABLISHMENT OF A NEW TRANSIENT KEY

Figure 6:
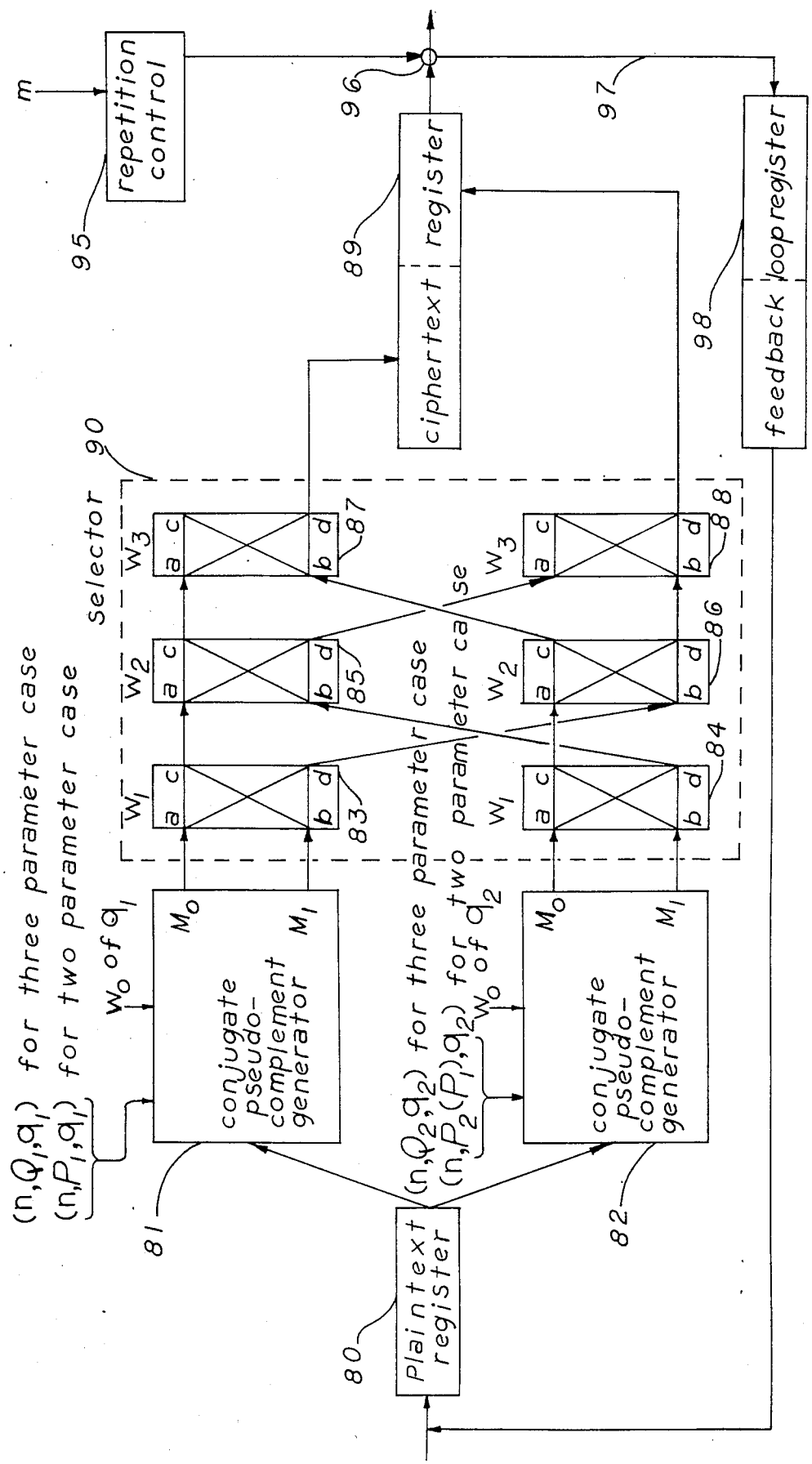
FIG. 6 is a block diagram of conjugate pseudocomplement generators using two keys composed by two parameters or three parameters.

When a sender initiates an inquiry for a new transient key by sending an authorized receiver a $C_s$ (for example, $C_s = P_s^* + S +$) which is a half of a conjugate pseudocomplement pair of a parameter $P_s$ with respect to a system key $S$, the receiver uses the parameters $S$ and $C_s$ as $P_1$ and $P_2(P_1)$ for enciphering the transient key $P_r$ as his message (a plaintext $A$) in the enciphering process illustrated in FIG. 6. And he transmits the enciphered message (for example, $P_r^{*\prime} + S +$ and $P_r^{+\prime} + C_s +$) to the sender. The sender who receives the enciphered message firstly enciphers $P_r^{*\prime} + S +$ to $(P_r^{*\prime} + S +) +_P +P_s +$ = $P_r^* + S + {}^\prime + P_s +$ = $P_r^* + P_s^* + S +$ based on eq. (3-3) by using an encipher device shown in FIG. 4 where $S$ and $P_s$ are equivalent to $P_i$ and $P_j$ of eq. (3-3), respectively, and secondly deciphers $P_r^* + P_s^* + S +$ and $P_r^{+\prime} + P_s^* + S + (= P_r^{+\prime} + C_s +)$ into $P_r$ by using a decipher device shown in FIG. 5 where the parameter used is $P_s^* + S +$.

In FIG. 5, suppose that $P_r^* + P_s^* + S +$ and $P_r^{+\prime} + P_s^* + S +$ are loaded in the right half and in the left half of the cipher register 73, respectively. Since, in this case, the order in the cipher register is the plus-star sequence (from the left to the right) of the pseudocomplements, the $w_0$ is on, namely $w_0=1$ in switch 70. The bits $u_1u_0$ and $v_1v_0$ are $u_1u_0=00$ and $v_1v_0=11$ due to the pseudocomplement symbols $*$ and $+\prime$, respectively. Accordingly to the operations discussed above, the applied deciphering operations are $X'$ on $P_r^* + P_s^* + S +$ and $X_p$ on $P_r^{+\prime} + P_s^* + S +$ usig the parameter $P_s^* + S +$ through the star operation 68 and the plus operation 69, respectively. And the applied operations result in $P_r^{*\prime} + P_s^* + S +$ at the $M_0$ register 71 and in $P_r^{++} - P_s^* + S +$ at the $M_1$ register 72, respectively.

The contents of the two registers $M_0$ and $M_1$ are ORed to produce the plaintext $P_r$ in the plaintext register 66. Note: The terms $P_r$, $P_s$ and $S$ are equivalent to $A$, $P_j$ and $P_i$ in eq. (3-3) respectively and $S^{+\prime} + P_s +=P-{}_s^* + S +$ of eq. (4-2) is used here.

A CRYPTOGRAPHIC SYSTEM USING TWO ENCIPHER/DECIPHER KEYS

When a higher degree of message security, like an establishment of a new ciphering transient key discussed in the preceding section, is desired, both parties in communication can establish two keys rather then one, and the sender can encipher a plaintext into a pair of conjugate pseudocomplements derived independently from the two parameters. Generally, the parties choose an equation among eq.s (3-1) through (3-16), for example, eq. (3-3), i.e., $$(A^{*\prime} + P_i +)^+{}_P + P_j + = (A^* + P_i +)^{+\prime} + P_j + =$$

$$A^+{}_P + P_i + + P_j + + = \underline{A^* + P_i +{}^\prime + P_j + +} .$$

Furthermore, suppose that the sender takes a plus pseudocomplement of the message $A$ with respect to $P_i +{}^\prime + P_j +$, for example $A^+{}_P + P_i +{}^\prime + P_j +$ *as a buddy of* $A^* + P_i +{}^\prime + P_j + +$ of the conjugate pair $(A^*, A^+{}_P)$ with respect to $P_i +{}^\prime (+ P_j +$ where the $A^*$ pseudocomplement is underlined in the equation above, then he must encipher his message $A$ by $A^{*\prime} + P_i +$ (or $A^* + P_i +$) according to the first (or the second) term of eq. (3-3) and send a pair of pseudocomplements $A^+{}_P + P_i +{}^\prime + P_j + +$ and $A^{*\prime} + P_i +$ (or $A^* + P_i +$) to the receiver. The receiver shall encipher his received pseudocomplement $A^{*\prime} + P_i +$ (or $A^* + P_i +$) by taking the specified pseudocomplementing operation $(\ )^+{}_P + P_j +$ appeared in the first term (or $(\ )^{+\prime} + P_j +$ appeared in the second term) of eq. (3-3) in order to acquire the fourth term $A^* + P_i +{}^\prime P_j + +$ of eq. (3-3). Since he has the pair of the conjugate pseudocomplements $A^* + P_i +{}^\prime + P_j + +$ and $A^+{}_P + P_i +{}^\prime + P_j + +$ of the message $A$ with respect to the parameter $P_i +{}^\prime + P_j +$, the plaintext $A$ can be recovered by performing $(A')' = (A +_P A^*)' = A^{++} + A^{*\prime}$ which is eq. (2-1) by the receiver.

FIG. 6 depicts an enciphering process using two parameters where $P_1$ and $P_2$ are equivalent to $P_i$ and $P_j$ of eq.s (3). A plaintext $A$ is loaded in the plaintext register 80 and two keys, $(n, P_1, q_1)$ and $(n, P_2(P_1), q_2)$, are set in the two conjugate complement generators 81 and 82 respectively where $P_2(P_1)$ denotes a pseudocomplement $P_2$ with respect to $P_1$. Each generator produces a star pseudocomplement and a plus pseudocomplement at the $M_0$ and $M_1$ terminals of the generator from the plaintext $A$ and its key where the $M_0$ and $M_1$ terminals are the $M_0$ register 51 and the $M_1$ register 52 in FIG. 4. The switches, 83 and 84, which are a part of selector 90 named with $w_1$, negates the effect of switch 50, which is $w_0$, in FIG. 4 at the exit of each generator, specifically it restores the order of the star pseudocomplement and the plus pseudocomplement, namely $w_0=0$ providing the star-plus sequence. Note: In order to negate the effect of the switch $w_0$, the control bit of $w_1$ must be the same as the bit of $w_0$ in this restoring process. Selector 90 consisting of the four additional switches 85, 86, 87 and 88, which are $w_2$ and $w_3$, selects a star pseudocomplement and a plus pseudocomplement with respect to two parameters $P_1$ and $P_2(P_1)$, respectively, and arranges the order of the selected two pseudocomplements in the ciphertext register 89 depending upon the switch control bit $w_2$ and $w_3$ where selector 90 may be a part of the q component of the key.

An example of a sequential event, which illustrates how to choose these switch control bits $w_1$, $w_2$ and $w_3$, and the q components of the keys, is described here. In other words, it is assumed that two transient keys and the bits $w_1$, $w_2$ and $w_3$, which may be a part of the q component of the keys, are being established between a sender and a receiver. The sender sets the two parameters, $P_1$ and $P_2(P_1)$, in the two generators 81 and 82 respectively. For example, he choose the pseudocompl-ments $*\prime$ and $+_P$ by placing $u_1u_0=11$ and $v_1v_0=10$ in the corresponding $q_1$ and $q_2$ of the two keys, respectively when the keys are eatablished. Note: The bits $v_1v_0$ of $q_1$ and the bits of $u_1u_0$ of $q_2$ are "don't care" of Boolean algebra. Each generator procedues the star and plus pseudocomplements specified by the bits $u_1u_0$ and $v_1v_0$ in each key. Remark: The other halves of the two conjugate pairs generated by the two "don't care" codes are not in this case. Thus, the bits $w_1(=w_0)$, $w_2$ and $w_3$ that are used in the switches 83 through 88, must be chosen properly in order to purposely place the *' pseudocomplement and the $+p$ pseudocomplement in the ciphertext register 89. For example, by setting $w_1=0$, $w_2=0$ and $w_3=1$, the pseudocomplements A*'-(-P_1-)- and A+_p-(-P_2(P_1)-)- are placed in the left half and in the right half of the ciphertext register 89 from the $M_0$ terminal of generator 81 and from the $M_1$ terminal of generator 82, respectively.

A deciphering process of this example is illustrated next. The receiver obtains the ciphertext in the ciphertext register 100 in FIG. 7. Then, in this example, the conjugate pseudocomplement generator 110 performs the pseudocomplementing operation with respect to $P_2$, i.e., ( )+_p-(-P_2-)- on A*'-(-P_1-)- passing via the switches $w_3$ and $w_2$, which are a part of selector 101, from the ciphertext register. The result of the pseudocomplementation (A*'-(-P_1-)-)+_p-(-P_2-)- appeared at the $M_0$ terminal of generator 110 is equivalent to A*-(-P_2*-)-P-_1-)-)-(=A*-(-P_1+'-(-P_2-)-)- according to eq. (4-2)) where the bits $u_1u_0$, $v_1v_0$ and $w_0$ of $q_a$ in the key $(n,P_2,q_a)$ used by generator 110 are "don't care", 10 and 1, respectively. Remark: The control bit of $w_0$ in switch 50 is different from the control bit of $w_1$ in switches 106 and 107 because eq. (3-3) indicates that the $^{30}$ _p_ pseudocomplement on A*'-(-P_i-)- with respect to $P_j$ is equivalent to the * pseudocomplement on A with respect to $P_i+'-(-P_j-)-$, i.e., (A*'-(-P_i-)-)+_p-(-P_j-)-=A*-(-P_i+'-(-P_j-)-. In other words, the resultant of the $+p$ pseudocomplementation on A*'-(-P_i-)- must be treated as the * pseudocomplement of A with respect to $P_i+'-(-P_j-)-$. Therefore, the bit of $w_0$ must be on (=1).

The pseudocomplement A+_p-(-P_1+'-(-P_2-)-)- in the ciphertext register 100 reaches at the $M_1$ terminal (and at the $M_0$ terminal) of box 111 passing via the switches $w_3$ and $w_2$. Subsequently, the pseudocomplements A*-(-P_1+'-(-P_2-)-)- appeared at the $M_0$ terminal of generator 110 and A+_p-(-P_1+'-(-P_1-)-)- appeared at the $M_1$ terminal of box 111 are stored in the left half and in the right half of register 108, respectively. From the discussion above, the control bits of $w_3$, $w_2$ and $w_1$ are set with $w_3=1$, $w_2=0$ and $w_1=0$, respectively. The conjugate pseudocomplement desegregator 109 which is the same as the desegregator described in FIG. 5 receives a key $(n,P_2(P_1),q_b)$ and the content of register 108, and produces the pseudocomplement of a targeted pair (A*',A++) from (A*,A+_p) with respect to $P_1+'-(-P_2-)-$ specified by the control bits of the $q_b$ component of the key. In this example, node 74 of the desegregator in FIG. 5 performs OR operation on the targeted pair (A*',A++) specified in eq. (2-1) which concludes the deciphering process by storing the plaintext A in the plaintext register 114.

Relationships between these chosen pseudocomplements and the bits $w_0$, $u_1u_0$ and $v_1v_0$ of $q_1$, $q_2$, $q_a$ and $q_b$, which are derived from eq.s (3-3) and (4-2), are summarized here by assuming $w_1=0$, $w_2=0$ and $w_3=1$ in the example. For the $q_1$ of $P_1$ in generator 81, the bits $w_0=0$ (this means the star-plus sequence), $u_1u_0=11$ and $v_1v_0=$(— —) are determined from A*'-(-P_1-)- appeared at the $M_0$ terminal of generator 81 and stored in the left half of the ciphertext register 89; for the $q_2$ of $P_2(P_1)$ in generator 82, the bits $w_0=0$ (this means the star-plus sequence), $u_1u_0=$(— —) and $v_1v_0=10$ are determined from A+_p-(-P_1+'-(-P_2-)-)-=A+_p-(-P_2*-(-P_1-)-)- appeared at the $M_1$ terminal of generator 82 and stored in the right half of the ciphertext register 89; for the $q_a$ of $P_2$ in generator 110, the bits $w_0=1$, (see the remark above), $u_1u_0=$(— —) and $v_1v_0=10$ are determined from (A*'-(-P_1-)-)+_p-(-P_2-)-=A*-(-P_1+'-(-P_2-)-)-=A*-(-P_2*-(-P_1-)-)- appeared at the $M_0$ terminal of generator 110 and stored in the left half of register 108; for the $q_b$ of $P_2(P_1)$ in desegregator 109, the bits $w_0=0$ (this means the star-plus sequence), $u_1u_0=00$ and $v_1v_0=10$ are determined from A*-(-P_2*-(-P_1-)-)- stored in the left half and A+_p-(-P_2*-(-P_1-)-)- stored in the right half of register 108 which is connected to the star operation 68 and to the plus operation 69 of the desegregator (see FIG. 5), respectively where bars (— —) indicate "don't care" bits. Similarly, one can determine the bits $w_0$, $u_1u_0$ and $v_1v_0$ as well as the bits $w_1$, $w_2$ and $w_3$ in other cases.

AN EXAMPLE USING BINARY BITS STRINGS

When $P_1=01101011$, $P_2=10101100$ and A (message)=11011011 in the discussion above, the sender produces P_2*-(-P_1-)-=01111011, A*'-(-P_1-)-=10010000 and A+_p-(-P_2*-(-P_1-)-)-=10100100, and transmits the ciphertext 1001000010100100 (in the star-plus sequence) to the receiver who shall find it in the ciphertext register 100. Since $w_3=1$, $w_2=0$ and $w_1=0$ in selector 101 (and in selector 90), the A*—P_2*—p_1—— pseudocomplement and the A+_p-(-P_2*-(-P_1-)-)- pseudocomplement are in the left half and in the right half of register 108, respectively where generator 110 performs the pseudocomplementing operation $+p$ on A*'-(-P_1-)-, i.e., (A*'-(-P_1-)-)+_p-(-P_2-)-=A*-(-P_2*-)-P_1-)-)-=01111111 and produces it at the $M_0$ terminal of the generator and where the half of the ciphertext, which is A+_p-(-P_2*-(-P_1-)-)-, appears at the $M_1$ terminal of box 111 through node 113. The content of register 108 are now a pair of the conjugate pseudocomplements of A with respect to P_2*-(-P_1-)-. Desegregator 109 retrieves the plaintext A from (A*-(-P_2*-(-P_1-)-)-)'=10000000 and (A+_p-(-P_2*-(-P_1-)-)-)'=01011011 by accomplishing the logical OR operation of 10000000+01011011=11011011 at node 74 shown in FIG. 5. The ORed result, which is the bit string of the message A, appears in the plaintext register 114.

PUBLIC KEY SYSTEM

If an encipher key, which is known to general public, is different from its corresponding decipher key, which is kept in secret and which is difficult to derive from the encipher key, then this cryptographic system is called a public key system. When the two keys used in the preceding discussion of this invention are enciphered by a third key, the conditon of a public key system is satisfied. Namely, the condition is that a decipher key is different from its corresponding encipher key and is difficult to derive from the encipher key. In this case, the following relationships of three keys, $P_i$, $P_j$ and $P_k$ exist:

| $P_1(Q_1)$ | $Q_2(Q_3)$ | $Q_1(P_1)$ |
|---|---|---|
| $P_i+$-(-$P_j$+_p$-(P_k$-)--)- = | | (6-1) |
| | ($P_i*^P$-(-$P_j$)-)**-(-$P_i*^P$-(-$P_k$-)-- = | |
| | | ($P_j+$_p$-(-$P_k$-)-)*'-(-$P_i$-)- |
| $P_i+$-(-$P_j*$-(-$P_k$-)-)- = | | (6-2) |
| | ($P_i*^P$-(-$P_j$-)-)**-(-$P_i+$-(-$P_k$-)-)- = | |
| | | ($P_j*$-(-$P_k$-)-)*'-(-$P_i$-)- |

-continued

| $P_1(Q_1)$ | $Q_2(Q_3)$ | $Q_1(P_1)$ |
|---|---|---|

$$P_i{}^+-(P_j{}^+{}'-(P_k)-)- = \\ (P_i{}^+-(P_j)-)^{**}-(P_i{}^{*P}-(P_k)-)- = \\ (P_j{}^+{}'-(P_k)-)^{*'}-(P_i)- \quad (6\text{-}3)$$

$$P_i{}^+-(P_j{}^{}-(P_k)-)- = \\ (P_i{}^+-(P_j)-)^{}-(P_i{}^+-(P_k)-)- = \\ (P_j{}^{**}-(P_k)-)^{*'}-(P_i)- \quad (6\text{-}4)$$

$$P_i{}^{++}-(P_j{}^+{}_P-(P_k)-)- = \\ (P_i{}^+-(P_j)-)^{**}-(P_i{}^{*'}-(P_k)-)- = \\ (P_j{}^+{}_P-(P_k)-)^{++}-(P_i)- \quad (6\text{-}5)$$

$$P_i{}^{++}-(P_j{}^*-(P_k)-)- = \\ (P_i{}^{*'}-(P_j)-)^{**}-(P_i{}^{++}-(P_k)-)- = \\ (P_j{}^*-(P_k)-)^{++}-(P_i)- \quad (6\text{-}6)$$

$$P_i{}^{++}-(P_j{}^+{}'-(P_k)-)- = \\ (P_i{}^{++}-(P_j)-)^{**}-(P_i{}^{*'}-(P_k)-)- = \\ (P_j{}^+{}'-(P_k)-)^{++}-(P_i)- \quad (6\text{-}7)$$

$$P_i{}^{++}-(P_j{}^{}-(P_k)-)- = \\ (P_i{}^{++}-(P_j)-)^{}-(P_i{}^{++}-(P_k)-)- = \\ (P_j{}^{**}-(P_k)-)^{++}-(P_i)- \quad (6\text{-}8)$$

$$P_i{}^*-(P_j{}^{*P}-(P_k)-)- = \\ (P_k{}^+{}_P-(P_j)-)^{++}-(P_i{}^+{}_P-(P_k)-)- = \\ (P_j{}^{*P}-(P_k)-)^{+'}-(P_i)- \quad (6\text{-}9)$$

$$P_i{}^*-(P_j{}^+-(P_k)-)- = \\ (P_i{}^+{}_P-(P_j)-)^{++}-(P_i{}^*-(P_k)-)- = \\ (P_j{}^+-(P_k)-)^{+'}-(P_i)- \quad (6\text{-}10)$$

$$P_i{}^*-(P_j{}^{*'}-(P_k)-)- = \\ (P_i{}^*-(P_j)-)^{++}-(P_i{}^+{}_P-(P_k)-)- = \\ (P_j{}^{*'}-(P_k)-)^{+'}-(P_i)- \quad (6\text{-}11)$$

$$P_i{}^*-(P_j{}^{++}-(P_k)-)- = \\ (P_i{}^*-(P_j)-)^{++}-(P_i{}^*-(P_k)-)- = \\ (P_j{}^{++}-(P_k)-)^{+'}-(P_i)- \quad (6\text{-}12)$$

$$P_i{}^{**}-(P_j{}^{*P}-(P_k)-)- = \\ (P_i{}^+{}'-(P_j)-)^{++}-(P_i{}^+{}'-(P_k)-)- = \\ (P_j{}^{*P}-(P_k)-)^{**}-(P_i)- \quad (6\text{-}13)$$

$$P_i{}^{}-(P_j{}^+-(P_k)-)- = \\ (P_i{}^+{}'-(P_j)-)^{++}-(P_i{}^{}-(P_k)-)- = \\ (P_j{}^+{}'-(P_k)-)^{**}-(P_i)- \quad (6\text{-}14)$$

$$P_i{}^{**}-(P_j{}^{*'}-(P_k)-)- = \\ (P_i{}^{**}-(P_j)-)^{++}-(P_i{}^+{}'-(P_k)-)- = \\ (P_j{}^{*'}-(P_k)-)^{**}-(P_i)- \quad (6\text{-}15)$$

$$P_i{}^{}-(P_j{}^{++}-(P_k)-)- = \\ (P_i{}^{}-(P_j)-)^{++}-(P_i{}^{}-(P_k)-)- = \\ (P_j{}^{++}-(P_k)-)^{}-(P_i)- \quad (6\text{-}16)$$

By using eq.s (6) eq.s (3) (also eq.s (4) and eq.s (5) if these are needed), one can determine applicable pseudocomplementing operations on a plaintext A employing the three parameters by parties of a sender and a receiver. For simplicity in the following presentation, three compound parameters $Q_1$, $Q_2$ and $Q_3$ are defined: $Q_1=P_j(P_k)$, $Q_2=P_i(P_j)$ and $Q_3=P_i(P_k)$ where $P(Q)$ denotes a pseudocomplement of P with respect to Q. Firstly, by choosing an equation among eq.s (6-1) through (6-16), one can determine two applicable pseudocomplementing operations on $Q_1$ with respect to $P_1$, which is equivalent to $P_1$ in this case, and on $Q_2$ with respect to $Q_3$. Next, by considering the paired terms of the pseudocomplementing operations on $Q_1(P_1)$ and $Q_2(Q_3)$, one selects two equations from eq.s (3-1) through (3-16) which include the pseudocomplements of a message A with respect to the paired terms, i.e., $A-Q_1(P_1)-$ and $A-Q_2(Q_3)-$ (an example is presented later). Finally, from three chosen equations and the pseudocomplements of the two paired terms, one can find the applicable enciphering pseudocomplements by the sender and the applicable deciphering pseudocomplements by the receiver.

An example: Firstly, by choosing an equation such as eq. (6-3), $P_i{}^+-(P_j{}^+{}'-P_k)-)- = (P_i{}^+-(P_j)-)^{**}-(P_i{}^{*P}-(P_k)-)- = (P_j{}^+{}'-P_k)-)^{*'}-(P_i)-$, which is equivalent to $P_i{}^+-(Q_1)-= Q_2{}^{**}-(Q_3)-=Q_1{}^{*'}-(P_i)-$ after substituting $Q_1=P_j{}^+{}'-(P_k)-$, $Q_2=P_i{}^+-(P_j)-$ and $Q_3=P_i{}^{*P}-(P_k)-$, one can determine $P_1=P_i$ and the pseudocomplements $+'$, $+$ and $*P$ of $P_j$, $P_i$ and $P_j$ with respect to $P_k$, $P_j$ and $P_k$, respectively. Next, by considering the pseudocomplements $*'$ and $**$ of the paired terms $Q_1(P_1)$ and $Q_2(Q_3)$, which are underlined in the equation above, one can find eq.s (3-2), (3-6), (3-11) and (3-15) which include the pseudocomplement $*'$ of $P_i(P_j)$ in the third terms where $P_i$ and $P_j$ are now equivalent to $Q_1$ and $P_1$ respectively, and eq.s (3-4), (3-8), (3-9) and (3-13) which include the pseudocomplement $**$ of $P_i(P_j)$ in the fourth terms where $P_i$ and $P_j$ are now equivalent to $Q_2$ and $Q_3$ respectively. Finally, suppose that one takes eq.s (3-11) and (3-4) arbitrarily. Then the two equations become $(A+-(Q_1)-)^{*'}-(P_1)-=(A+{}'-(Q_1)-)^{*P}-(P_1)-=A+-(Q_1{}^{*'}-(P_1)-)-=A^{*P}-(Q_1{}^*-(P_1)-)-$ and $(A^*-(Q_2)-)^{**}-(Q_3)-=(A^{*'}-(Q_2)-)^*13-q_3-=A+{}_P-(Q_2{}^{*P}-(Q_3)-)-=A^*-(Q_2{}^{**}-(Q_3)-)-$ after substituting the equivalent terms in each equation. The underlines of the terms $Q_1{}^{*'}-P_1-$ and $Q_2{}^{**}-Q_3-$ indicate the paired pseudocomplement terms considered according to eq. (6-3).

Lastly, the applicable pseudocomplementing operations to a message A by the sender are betokened from the two chosen eq.s (3-11) and (3-4). The necessary operations applicable to the message A by the sender are $A+-(Q_1)-$ (or $A+{}'-(Q_1)-$) and $A^*-(Q_2)-$ (or $A^{*'}-(Q_2)-$) which are the first terms (or the second terms) of each equation that was taken. Then the sender transmits these generated plus and star pseudocomplements to the receiver as a ciphertext from the ciphertext register 89. The necessary operations applicable to the received ciphertext by the receiver are $(\ )^{*'}-(P_1)-$ (or $(\ )^{*P}-(P_1)-$) and $(\ )^{**}-(Q_3)-$ (or $(\ )^*-(Q_3)-$) which are the first terms (or the second terms) of each equation that was taken. After performing these pseudocomplementing operations, the receiver now has a pair of conjugate pseudocomplements $A+-(Q_1{}^{*'}-(P_1)-)-$ and $A^*-(Q_2{}^{**}-(Q_3)-)-$ where the term $Q_1{}^{*'}-(P_1)-$ is equal to the term $Q_2{}^{}-(Q_3)-$ according to eq. (6-3). Thus he can decipher the pair into the plaintext A with respect to the parameter $Q_2{}^{}-(Q_3)-$ ($=Q_1{}^{*'}-(P_1)-$).

In conclusion, the encipher parameters $Q_1=P_j{}^+{}'-(P_k)-$ ($=P_k{}^*-(P_j)-$) and $Q_2=P_i+-(P_j)-$ ($=P_j{}^{*'}-(P_i)-$) are two single components of pseudocomplements of two conjugate pairs with respect to two parameters $P_k$ and $P_j$ generated independently. The decipher parameters $P_1$ ($=P_i$) and $Q_3=P_i{}^{*P}-P_k-$ are different from the encipher parameters $Q_1$ and $Q_2$. A retrieval of $P_i$ and $P_k$ from the eccipher parameters for an attempting restoration of the decipher parameters is difficult without knowing $P_j$ because of the single components of the pseudocomplements generated independently.

Figure 7:
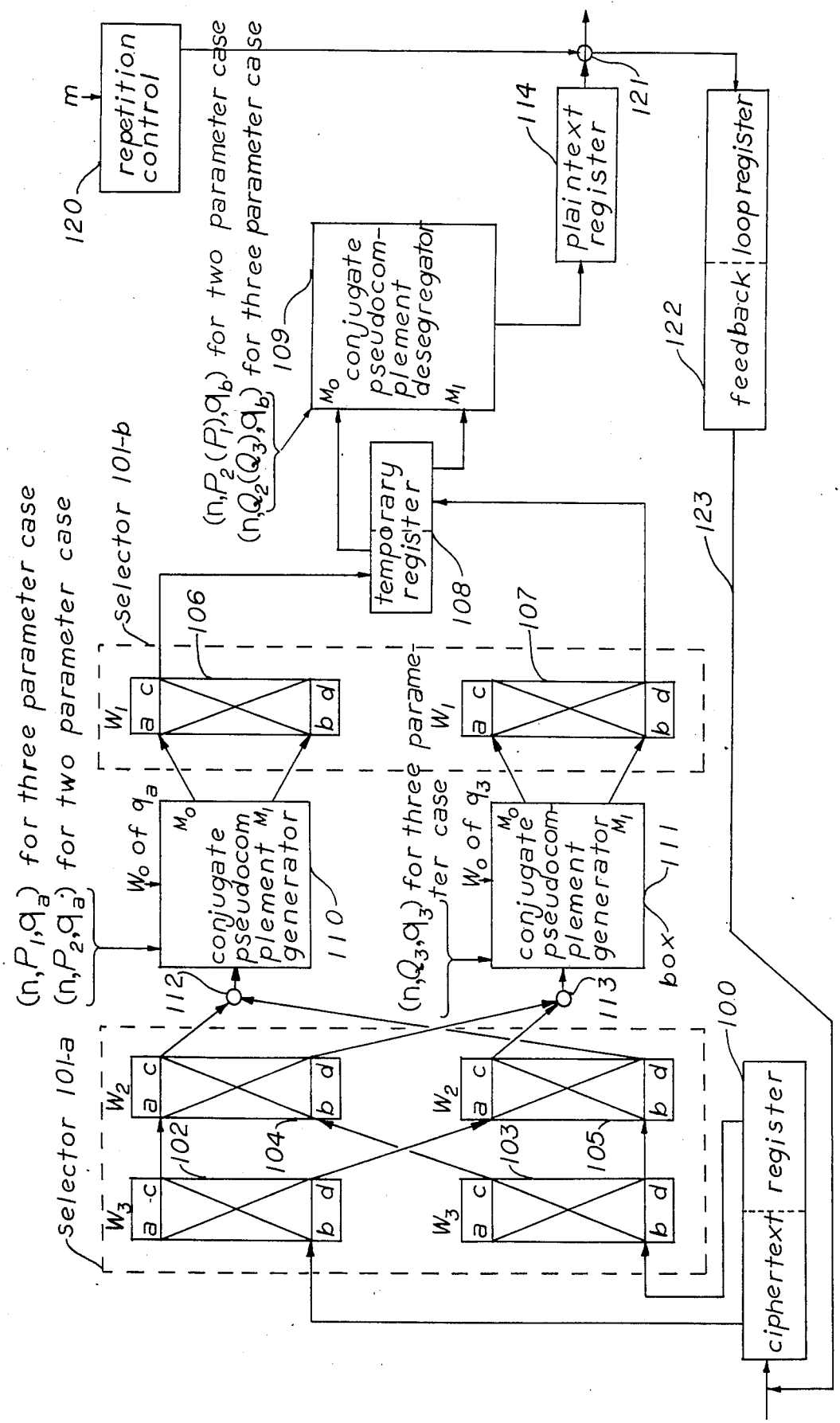
FIG. 7 is a block diagram of conjugate pseudocomplement desegregators using the two keys composed by two parameters or three parameters.

This example of the invented public key system using the chosen pseudocomplements for the enciphering process by the sender and the deciphering process by the receiver is depicted in FIGS. 6 and 7 where the definition of the key (n,P,q) consisting of three components: (i) n=block size of a plaintext, (ii) P=pseudocomplement parameter and (iii) q=combinational identifier of a conjugate pair of pseudocomplements is used. The encipher keys $(n,Q_1,q_1)$ and $(n,Q_2,q_2)$ are supplied to generators 81 and 82, respectively. Each generator illustrated in FIG. 4. The pseudocomplements, $A^+\dashv Q_1\dashv$ appeared at the $M_0$ terminal of generator 81 and $A^*\dashv Q_2\dashv$ appeared at the $M_1$ terminal of generator 82, are designated by two bit-pairs of the switch control bits $(u_1u_0)$, $(v_1v_0)$ and $w_0$ which are $(u_1u_0=$don't care), $(v_1v_0=00)$ and $w_0=1$ in $q_1$, and $(u_1u_0=00)$, $(v_1v_0=$don't care) and $w_0=1$ in $q_2$. The bit $w_0=1$ means that one selects the order of the plus-star sequence in the ciphertext register 89. Namely, the plus pseudocomplement $A^+\dashv Q_1\dashv$ is in the left half and the star pseudocomplement $A^*\dashv Q_2\dashv$ is in the right half of the ciphertext register 89. Therefore, the control switch bits $w_1(=w_0)$, $w_2$ and $w_3$ of selector 90 must be 1, 1 and 0, respectively. When a plaintext A enters in the plaintext register 80 and an enciphering process starts, the enciphering device in FIG. 6 produces the ciphertext in the ciphertext register 89 which contains $A^+\dashv Q_1\dashv$ and $A^*\dashv Q_2\dashv$ from the left to the right.

In a deciphering process after receiving the ciphertext in the ciphertext register 100, the control switch bits $w_3=0$, $w_2=1$ and $w_1=1$ in selector 101 are the same as these in selector 90. Thus, the plus pseudocomplement $A^+\dashv Q_1\dashv$ appeared at node 112 and the star pseudocomplement $A^*\dashv Q_2\dashv$ appeared node 113 are the inputs to generators 110 and 111, respectively. When the keys $(n,P_1, q_a)$ and $(n,Q_3,q_3)$ are supplied to generators 110 and 111, respectively, the generators apply pseudocomplementing operations $(\ )^{*'}\dashv P_1\dashv$ on the input $A^+\dashv P_1\dashv$ and $(\ )^{**}\dashv Q_3\dashv$ on the input $A^*\dashv Q_2\dashv$ to produce $A^+\dashv Q_1{^{*'}}\dashv P_1\dashv\dashv$ at the $M_1$ terminal of generator 110 and $A^*\dashv Q_2{^{**}}\dashv Q_3\dashv\dashv$ at the $M_0$ terminal of generator 111 according to eq.s (3-11) and (3-4), respectively.

Since there are $(A^+\dashv Q_1\dashv)^{*'}\dashv P_1\dashv\dashv=A^+\dashv Q_1{^{*'}}\dashv P_1\dashv\dashv=A^+\dashv Q_2{^{**}}\dashv Q_3\dashv\dashv$ in eq. (3-11) and $(A^*\dashv Q_2\dashv)^{**}\dashv Q_3\dashv\dashv=A^*\dashv Q_2{^{**}}\dashv Q_3\dashv\dashv$ in eq. (3-4), the two switch control bits $w_0$'s (referencing switch 50 in FIG. 4) of $q_a$ and of $q_3$ must be 1 (on) and 0 (off) respectively due to the correspondences between the applied pseudocomplementing operation $(\ )^{*'}$ and its resultant pseudocomplement $A^+\dashv Q_2{^{}}\dashv Q_3\dashv\dashv$ and between the applied operation $(\ )^{}$ and its resultant pseudocomplement $A^*\dashv Q_2{^{**}}\dashv Q_3\dashv\dashv$, i.e., a change from a star $*'$ to a plus $+$ of the pseudocomplements in the former and no change from a (double) star $**$ to a star $*$ of the pseudocomplements in the latter.

Consequently, the paired conjugate pseudocomplements $A^+$ and $A^*$ with respect to $Q_2{^{**}}\dashv Q_3\dashv(=Q_1{^{*'}}\dashv P_1\dashv)$ appear in the left half and in the right half of the temporary register 108 through the control switches 106 and 107, respectively. Note: The order of the pseudocomplements in the temporary register is the plus-star sequence. Furthermore, these pseudocomplementing operations $(\ )^{*'}$ with respect to $P_i$ and $(\ )^{**}$ with respect to $Q_3$ are specified by setting $(u_1u_0=11)$ and $v_1v_0=$don't care) in $q_a$, and $(u_1u_0=01)$ and $v_1v_0=$don;t care) in $q_3$, respectively.

The conjugate pseudocomplement desegregator 109, which is depicted in FIG. 5, retrieves the plaintext A from the conjugate pseudocomplements with respect to $Q_2{^{**}}-Q_3-$ by obtaining a targeted pair of pseudocomplements utilizing the key $(n,Q_2(Q_3),q_b)$ and by performing an OR operation on the targeted pair, and stores the retieved plaintext A in the plaintext register 114. The control bits $(u_1u_0)$, $(v_1v_0)$ and $w_0$ of $q_b$ are $(u_1u_0=00)$, $(v_1v_2=00)$ and $w_0=1$. These are derived from the fact: the pseudocomplements $A^+$ and $A^*$, and the plus-star sequence in the temporary register 108.

Consider the following bit strings for $P_1=P_i=01101011$, $P_2=P_j=10101100$, $P_3=P_k=01111101$ and A($=$plaintext message)$=11011011$ in the above example where $Q_1=P_2{^{+'}}\dashv P_3\dashv=10101110$, $Q_2=P_1{^+}\dashv P_2\dashv=10000100$, $Q_3=P_1{^{*P}}\dashv P_3\dashv=10000000$ and $Q_2{^{**}}\dashv Q_3\dashv=10000100$. The sender produces the pseudocomplements $A^+\dashv Q_1\dashv=00100100$ and $A^*\dashv Q_2\dashv=10100100$ and stores these in the left half and in the right half of the ciphertext register 89, respectively. Then he transmits the ciphertext to the receiver.

When the receiver finds the content of the ciphertext register 100, the deciphering process starts. Generators 110 and 111 produce the pseudocomplements $(A^+\dashv Q_1\dashv)^{*'}\dashv P_1\dashv$, which is equivalent to $A^+\dashv Q_1{^{*'}}\dashv P_1\dashv\dashv=A^+\dashv Q_2{^{**}}\dashv Q_3\dashv\dashv=00000100$, appearing at the $M_1$ terminal of generator 110 and $(A^*\dashv Q_2\dashv)^{**}\dashv Q_3\dashv$, which is equivalent to $A^*\dashv Q_2{^{**}}\dashv Q_3\dashv\dashv=10100100$, appearing at the $M_0$ terminal of generator 111. Subsequently, these pseudocomplements $A^+$ and $A^*$ with respect to $Q_2{^{}}\dashv Q_3\dashv$ are stored in the left half and in the right half of the temporary register, respectively. The conjugate pseudocomplement desegregator 109 performs the complementing operations $(\ )^P$ and $(\ )'$, i.e., $(A^+\dashv Q_2{^{}}\dashv Q_3\dashv\dashv)^P\dashv Q_2{^{**}}\dashv Q_3\dashv\dashv=10000000$ and $(A^*\dashv Q_2{^{**}}\dashv Q_3\dashv\dashv)'=01011011$ and an OR operation on the results of the complementing operations to make $10010000+01001011=11011011$ ($=$plaintext). Finally, the plaintext bit string appears in the plaintext register 114.

Similar to the feedback loops, which are controlled by the repetition controls 6 and 16 in the figures in FIG. 2 respectively, from the ciphertext register to the plaintext register in the enciphering process shown in the former figure and from the plaintext register to the ciphertext register in the deciphering process shown in the latter figure, one can install the feedback loops in the enciphering process shown in FIG. 6 and in the deciphering process shown in FIG. 7 where both the processes use multiple parameters. When a repetition (control) constant m ($=2$), that may be a part of a key, is supplied to the repitition controls 95 and 120, the previous example becomes as follows.

In the enciphering process, the generated ciphertext, $A^+\dashv Q_1\dashv=00100100$ in the left half and $A^*\dashv Q_2\dashv=10100100$ in the right half, is feedbacked to the plaintext register 80 through the feedback path 97 in order to encipher one more time, namely $(A^+\dashv Q_1\dashv)\dashv+\dashv Q_1\dashv=10001010$, $(A^+\dashv Q_1\dashv)^*\dashv Q_2\dashv=11011111$, $(A^*\dashv Q_2\dashv)^+\dashv Q_1\dashv=00001010$ and $(A^*\dashv Q_2\dashv)^*\dashv Q_2\dashv=11011111$. The ciphertext is $1000101011011111100001010110111111$ in the nested plus-star sequence. In the deciphering process, the rightmost 16 bits of the ciphertext are deciphered as $(((A^*\dashv Q_2\dashv 0^+\dashv Q_1\dashv)^{*'}\dashv P_1\dashv)^P\dashv Q_2{^{**}}\dashv Q_3\dashv\dashv=11111111\cdot 10000100+00000000\cdot 01111011=100\text{-}00100$, $(((A^*\dashv Q_2\dashv)^*\dashv Q_2\dashv)^{**}\dashv Q_3\dashv)'=(00100000)'=00100000$ and OR operation on these results $10000100+00100000=10100100$. The leftmost 16 bits of the ciphertext are deciphered as $(((A^+\dashv Q_1\dashv)^+\dashv Q_1\dashv)^{*'}\dashv P_1-)^P\dashv Q_2{^{**}}\dashv Q_3\dashv\dashv=01111111\cdot 10000100+10000000\cdot 01111011=000\text{-}00100$, $(((A^+\dashv Q_1\dashv)^*\dashv Q_2\dashv)^{**}\dashv Q\text{-}$ 3—)'=(11011111)'=00100000 and OR operation on these results 00000100+00100000=00100100. The repetition control directs one more deciphering process for the current ciphertext 0010010010100100, which is the plus-star sequence of $A^+$—$Q_1$— and $A^*$—$Q_2$— as shown in the previous discussion, to retrieve the plaintext 11011011.

Since the length of an enciphered message (an enciphertext) is $2^m$ longer than the length of an original plaintext ($m \geq 1$), one can utilize this advantage of the $2^m$ longer length in order to increase cryptanalysis complexity. For example, by transmitting $2^m$-original length messages in $2^m$ independent communication passages from sender to receiver, the complexity of a decoding process can be increased. Also message scramble algorithms such as byte permutation may be applicable to ciphertext.

What is claimed is:

1. In a process for communicating securely over an insecure communication medium of the type which communicates a digital message A from a sender to a receiver by enciphering at said sender said digital massage with a secret enciphering/deciphering parameter P, by transmitting said enciphered massage from said sender to said receiver, and by deciphering at the receiver's end said enciphered message with said parameter, the process characterized in that said sender means includes means for receiving and storing said enciphering/deciphering parameter, means for receiving and enciphering said digital message by applying a conjugate pseudocomplementing operation with respect to said parameter, and means for transmitting said enciphered message to said receiver;

said receiver means includes means for receiving and storing said enciphered message, means for deciphering said enciphered message into said original digital message by applying a desegregate pseudocomplementing operation with respect to said parameter, and means for storing said deciphered digital message in a plaintext register which is a row of flipflops;

said conjugate pseudocomplementing operation includes means for transforming said digital message received by said sender into a pair consisting of a star pseudocomplement of $\{A^*,A^{**},A^{*P},A^{*'}\}$ by applying an operation of $\{X^*,X^{**},X^{*P},A^{*'}\}$ and a plus pseudocomplement of $\{A^+,A^{++},A^+_P,A^{+'}\}$ by applying an operation of $\{X^+,X^{++},X^+_P,X^{+'}\}$ with respect to said parameter P, and said desegregate pseudocomplementing operation includes means for transforming said enciphered message consisting of said star pseudocomplement and said plus pseudocomplement received by said receiver into a targeted pair of a star pseudocomplement and a plus pseudocomplement such as $\{(A^{*'},A^{++}),(A^{**},A^{+'0},(A^{*-P},A^+),(A^*,A^+_P),A^{*'},A^+),(A^{**},A^+_P),(A^{*P-},A^{++}),(A^*,A^{+'})\}$ by performing necessary Boolean algebra operations of $\{X_P,X',X^P,I\}$ with respect to said parameter, and means for combining the star pseudocomplement and the plus pseudocomplement of said targeted pair by a logical AND or a logical OR operation performing $A=A^{**}$ AND $A^{+'}=A^{*'}$ OR $A^{++}$, $A'=A^*$ AND $A^+_P=A^{*P}$ OR $A^+$, $A^P=A^{**}$ AND $A^+_P=A^{*'}$ OR $A^+$ or $A_P=A^*$ AND $A^{+'}=A^{*P}$OR $A^{++}$ in order to produce a deciphered message of $\{A,A',A^P,A_P\}$ and to convert said deciphered message into said original digital message by applying an operation of $\{I,X',X_P,X^P\}$, respectively.

2. The process for communicating securely over an insecure communication medium set forth in claim 1 including:

said necessary Boolean algebra operations for performing a transformation operation, which is indicated at the intersection of the table below, from a present pseudocomplement in the leftmost column to a targeted pseudocomplement in the top row,

| Star pseudocomplement | | | | Plus pseudocomplement | | | |
|---|---|---|---|---|---|---|---|
| | to | | | | to | | |
| from | * | ** | *P | *' | from | + | ++ | +P | +' |
| * | I | $X_P$ | $X^P$ | X' | + | I | $X^P$ | $X_P$ | X' |
| ** | $X_P$ | I | X' | $X^P$ | ++ | $X^P$ | I | X' | $X_P$ |
| *P | $X^P$ | X' | I | $X_P$ | +P | $X_P$ | X' | I | $X^P$ |
| *' | X' | $X^P$ | $X_P$ | I | +' | X' | $X_P$ | $X^P$ | I |

3. The process for communication securely over an insecure communication medium set forth in claim 1 including:

said conjugate psuedocomplementing operation means for forming said enciphered message from a single (a star or a plus) pseudocomplement derived from said digital message.

4. In a process for communication securely over an insecure communication medium of the type which communicates a digital message A from a sender to a receiver by enciphering at said sender said digital message using two secret enciphering/deciphering parameters $P_i$ and $P_j$, by transmitting said enciphered message from said sender to said receiver, and by deciphering at the receiver's end said enciphered message using said two parameterrs, the process characterized in that said sender means includes means for receiving and storing said two enciphering/deciphering parameters; means for procreating a compound parameter, a pseudocomplement $P_i$ with respect to $P_j$ denoted as $P_i(P_j)$, of $\{P_i^{*'}-(P_j)-, P_i^*-(P_j)-, P_i^{++}-(P_j)-, P_i^+{}_P-(P_j)-, P_i^{**}-(P_j)-, P_i^{*P}-(P_j)-, P_i^{+'}-(P_j)13, P_i^+-(P_j)-\}$ which appear in the third term or the fourth term of the equations (3-1)'through (3-16); means for receiving and enciphering said digital message A by applying two pseudocomplementing operations on said message A (i) with respect to the parameter $P_i$ in order to choose a pseudocomplement of A (with respect to $P_i$) which appears in the first term or the second term of an equation elected from the equations (3-1) through (3-16) where said compound parameter $P_i(P_j)$ exists in the third term or the fourth term as a parameter and (ii) with respect to said compound parameter $P_i(P_j)$ in order to produce a component of a conjugate psuedocomplement pair with respect to $P_i(P_j)$ where said component is a buddy of said pseudocomplement existed in the third term or the fourth term of said elected equation that contains said chosen pseudocomplement of A with respect to $P_i$ in the first term or the second term, $$(A^+{}_{P-(P_j)-})^{+'}-(P_j)- = (A^{++}-(P_j)-)^+{}_{P-(P_j)-} = A^+{}_{P-(P_i^{++}-(P_j)-)-} = A^*-(P_i^+{}_{P-(P_j)-})- \qquad (3\text{-}1)$$

-continued

| | | | | |
|---|---|---|---|---|
| $(A^+{}_P\text{-}(P_j\text{-})^{**}\text{-}(P_j)\text{-}$ | $= (A^{++}\text{-}(P_j)\text{-})^*\text{-}(P_j\text{-}$ | $= A^+{}_P\text{-}(P_i^{*'}\text{-}(P_j)\text{-})\text{-}$ | $= A^*\text{-}(P_i^*\text{-}(P_j)\text{-})\text{-}$ | (3-2) |
| $(A^*\text{-}(P_j)\text{-})^{+'}\text{-}(P_j)\text{-}$ | $= (A^{*'}\text{-}(P_j)\text{-})^+{}_P\text{-}(P_j)\text{-}$ | $= A^+{}_P\text{-}(P_i^+\text{-}(P_j)\text{-}$ | $= A^*\text{-}(P_i^{+'}\text{-}(P_j)\text{-})\text{-}$ | (3-3) |
| $(A^*{}_P\text{-}(P_j)\text{-})^{**}\text{-}(P_j)\text{-}$ | $= (A^{*'}\text{-}(P_j)\text{-})^*\text{-}(P_j)\text{-}$ | $= A^+{}_P\text{-}(P_i^{*P}\text{-}(P_j)\text{-}$ | $= A^*\text{-}(P_i^{**}\text{-}(P_j)\text{-})\text{-}$ | (3-4) |
| $(A^{+'}\text{-}(P_j)\text{-})^{+'}\text{-}(P_j)\text{-}$ | $= (A^+\text{-}(P_j)\text{-})^+{}_P\text{-}(P_j)\text{-}$ | $= A^{+'}\text{-}(P_i^+ +\text{-}(P_j)\text{-}$ | $= A^{**}\text{-}(P_i^+{}_P\text{-}(P_j)\text{-})\text{-}$ | (3-5) |
| $(A^{+'}\text{-}(P_i\text{-})^{**}\text{-}(P_j)\text{-}$ | $= (A^+\text{-}(P_j)\text{-})^*\text{-}(P_j)\text{-}$ | $= A^{+'}\text{-}(P_i^{*'}\text{-}(P_j)\text{-})\text{-}$ | $= A^{**}\text{-}(P_i^*\text{-}(P_j)\text{-})\text{-}$ | (3-6) |
| $(A^{**}\text{-}(P_j)\text{-})^{+'}\text{-}(P_j)\text{-}$ | $= (A^{*P}\text{-}(P_j)\text{-})^+{}_P\text{-}(P_j)\text{-}$ | $= A^{+'}\text{-}(P_i^+\text{-}(P_j)\text{-})\text{-}$ | $= A^{**}\text{-}(P_i^{+'}\text{-}(P_j)\text{-})\text{-}$ | (3-7) |
| $(A^{}\text{-}(P_j)\text{-})^{}\text{-}(P_j)\text{-}$ | $= (A^{*P}\text{-}(P_j)\text{-})^*\text{-}(P_j)\text{-}$ | $= A^+\text{-}(P_i^{*P}\text{-}(P_j)\text{-})\text{-}$ | $= A^{}\text{-}(P_i^{}\text{-}(P_j)\text{-})\text{-}$ | (3-8) |
| $(A^{*P}\text{-}(P_j)\text{-})^{*'}\text{-}(P_j)\text{-}$ | $= (A^{**}\text{-}(P_j)\text{-})^{*P}\text{-}(P_j)\text{-}$ | $= A^+\text{-}(P_i^{*P}\text{-}(P_j)\text{-})\text{-}$ | $= A^{*P}\text{-}(P_i^{**}\text{-}(P_j)\text{-})\text{-}$ | (3-9) |
| $(A^{*P}\text{-}(P_j)\text{-})^{++}\text{-}(P_j)\text{-}$ | $= (A^{**}\text{-}(P_j)\text{-})^+\text{-}(P_j)\text{-}$ | $= A^+\text{-}(P_i^+\text{-}(P_j)\text{-})\text{-}$ | $= A^{*P}\text{-}(P_i^{+'}\text{-}(P_j)\text{-})\text{-}$ | (3-10) |
| $(A^+\text{-}(P_j)\text{-})^{*'}\text{-}(P_j)\text{-}$ | $= (A^{+'}\text{-}(P_j)\text{-})^{*P}\text{-}(P_j)\text{-}$ | $= A^+\text{-}(P_i^{*'}\text{-}(P_j)\text{-})\text{-}$ | $= A^{*P}\text{-}(P_i^*\text{-}(P_j)\text{-})\text{-}$ | (3-11) |
| $(A^+\text{-}(P_j)\text{-})^{++}\text{-}(P_j)\text{-}$ | $= (A^{+'}\text{-}(P_j)\text{-})^+\text{-}(P_j)\text{-}$ | $= A^+\text{-}(P_i^{++}\text{-}(P_j)\text{-})\text{-}$ | $= A^{*P}\text{-}(P_i^+{}_P\text{-}(P_j)\text{-})\text{-}$ | (3-12) |
| $(A^{*'}\text{-}(P_j)\text{-})^{*'}\text{-}(P_j)\text{-}$ | $= (A^*\text{-}(P_j)\text{-})^{*P}\text{-}(P_j)\text{-}$ | $= A^{++}\text{-}(P_i^{*P}\text{-}(P_j)\text{-})\text{-}$ | $= A^{*'}\text{-}(P_i^{**}\text{-}(P_j)\text{-})\text{-}$ | (3-13) |
| $(A^{*'}\text{-}(P_j)\text{-})^{++}\text{-}(P_j)\text{-}$ | $= (A^*\text{-}(P_j)\text{-})^+\text{-}(P_j)\text{-}$ | $= A^{++}\text{-}(P_i^+\text{-}(P_j)\text{-})\text{-}$ | $= A^{*'}\text{-}(P_i^{+'}\text{-}(P_j)\text{-})\text{-}$ | (3-14) |
| $(A^{++}\text{-}(P_j)\text{-})^{*'}\text{-}(P_j)\text{-}$ | $= (A^+{}_P\text{-}(P_j)\text{-})^{*P}\text{-}(P_j)\text{-}$ | $= A^{++}\text{-}(P_i^{*'}\text{-}(P_j)\text{-})\text{-}$ | $= A^{*'}\text{-}(P_i^*\text{-}(P_j)\text{-})\text{-}$ | (3-15) |
| $(A^{++}\text{-}(P_j)\text{-})^{++}\text{-}(P_j)\text{-}$ | $= (A^+{}_P\text{-}(P_j)\text{-})^+\text{-}(P_j)\text{-}$ | $= A^{++}\text{-}(P_i^{++}\text{-}(P_j)\text{-})\text{-}$ | $= A^{*'}\text{-}(P_i^+{}_P\text{-}(P_j)\text{-})\text{-}$ | (3-16) | means for forming said enciphered message consisting of pseudocomplements of a conjugate pair constructed from said pseudocomplement obtained with respect to said parameter $P_i$ and said pseudocomplement with respect to said compound parameter $P_i(P_j)$; and means for transmitting said enciphered message to said receiver;

said receiver means includes means for receiving and storing said enciphered message received by said receiver; means for taking receiver-pseudocomplementing operation with respect to $P_j$ defined in the first term or the second term in order to acquire the third term or the fourth in said elected equation; means for transforming a pair consisting of
(i) the conjugate component with respect to $P_i(P_j)$, which is the third term or the fourth term of said elected equation, produced by said receiver-pseudocomplementing operation with respect to $P_j$ on said pseudocomplement with respect to $P_i$ of said enciphered message and (ii) the pseudocomplement with respect to said compound parameter $P_i(P_j)$ of said enciphered message into a targeted pair of $\{(A^{*'},A^{++}),(A^{**},A^{+'}),(A^{*P},A^+)$-$,(A^*,A^+{}_P),(A^{*'},A^+),(A^{**},A^+{}_P),(A^{*P},A^{++})$-$,(A^*,A^{+'})\}$ with respect to said compound parameter $P_i(P_j)$ by performing necessary Boolean algebra operations of $\{X_P,X',X^P,I\}$; and means for combining the star pseudocomplement and the plus pseudocomplement of said targeted pair by a logical AND or a logical OR separation which achieves $A=A^{**}\cdot A^{+'}=A^{*'}+A^{++},A'$-$=A^*\cdot A^+{}_P=A^{*P}+A^+,\qquad A^P=A^{**}\cdot A^+{}_P$-$=A^{*'}+A^+$ or $A_P=A^*\cdot A^{+'}=A^{*P}+A^{++}$ in order to retrieve a deciphered message of $\{A,A'$-$,A^P,A_P\}$ and to convert said deciphered message into said original digital message A by applying a respective operation of $\{I,X',X_P,X^P\}$, respectively;

said conjugate pseudocomplementing operations include means for transforming said digital message A received by said sender into two conjugate sets of a pair consisting of a star pseudocomplement of $\{A^*,A^{**},A^{*P},A^{*'}\}$ by applying an operation of $\{X^*,X^{**},X^{*P},X^{*'}\}$ and a plus pseudocomplement of $\{A^+,A^{++},A^+{}_P,A^{+'}\}$ by applying an operation of $\{X^+,X^{++},X^+{}_P,X^{+'}\}$, respectively (i) with respect to said parameter $P_i$ and
(ii) with respect to said compound parameter $P_i(P_j)$.

5. The process for communicating securely over an insecure communication medium set forth in claim 4 including:

said necessary Boolean algebra operations for performing a transformation operation, which is indicated at the intersection of the table below, from a present pseudocomplement in the leftmost column to a targeted pseudocomplement in the top row,

| Star pseudocomplement | | | | | Plus pseudocomplement | | | |
|---|---|---|---|---|---|---|---|---|
| | to | | | | | to | | |
| from | * | ** | *P | *' | from | + | ++ | +P | +' |
| * | I | $X_P$ | $X^P$ | $X'$ | + | I | $X^P$ | $X_P$ | $X'$ |
| ** | $X_P$ | I | $X'$ | $X^P$ | ++ | $X^P$ | I | $X'$ | $X_P$ |
| *P | $X^P$ | $X'$ | I | $X_P$ | +P | $X_P$ | $X'$ | I | $X^P$ |
| *' | $X'$ | $X^P$ | $X_P$ | I | +' | $X'$ | $X_P$ | $X^P$ | I |

6. An apparatus for communicating securely over an insecure communication medium of the type which communicates a digital message A from a sender to a receiver by enciphering at said sender said digital message with a secret enciphering/deciphering parameter P, by transmitting said enciphered message from said sender to said receiver, and by deciphering at the receiver's end said enciphered message with said parameter comprising:

s-plaintext register means for receiving and storing a digital message, s-P register means for receiving and storing a parameter P, s-q register means for receiving and storing control bits $u_1u_0$, $v_1v_0$ and $w_0$ of a component q, s-ciphertext register means for receiving and transmitting an enciphered message of said digital message, s-star operation means for performing a pseudocomplementing operation of $\{X^*,X^{**},X^{*P},X^{*'}\}$ with respect to said parameter P on said digital message, s-plus operation means for performing a pseudocomplementing operation of $\{X^+,X^{++},X^+{}_P,X^{+'}\}$ with respect to said parameter P on said digital message, s-switch means for connecting two input terminals (a,b) to two output terminals (c,d) by alternatively switching said connection (a,b) to (c,d) and (a,b) to (d,c) respectively using said control bit $w_0$, first means, connect said s-P register means, said s-plaintext register means and said s-q register means to said s-star operation means in order to obtain a star pseudocomplement, which is specified by the bits $u_1u_0$ of said s-q register means, of said digital message, second means, connect said s-P register means, said s-plaintext register means and said s-q register means to said s-plus operation means in order to obtain a plus pseudocomplement, which is specified by the bits $v_1v_0$ of said s-q register means, of said digital message, third means, connect said s-star operation means to said s-ciphertext register means through said s-switch means using said $w_0$ of said s-q register means in order to form said enciphered message with plus pseudocomplement and to transmit said enciphered message, fourth means, connect said s-plus operation means to said s-ciphertext register means through said s-switch means using said $w_0$ of said s-q register means in order to form said enciphered message with said star pseudocomplement and to transmit said enciphered message, r-ciphertext register means for receiving and storing said enciphered message, r-P register means for receiving and storing said parameter P, r-plaintext register means for receiving and storing a deciphered message of said enciphered message, r-q register means for receiving and storing said control bits $u_1u_0$, $v_1v_0$ and $w_0$ of a component q, r-switch means for connecting two input terminals (a,b) to two output terminals (c,d) by alternatively switching said connection (a,b) to (c,d) and (a,b) to (d,c) respectively using said control bit $w_0$, r-star operation means for performing a complementing operation of $\gamma X', X^P, X_P, I\}$ with respect to said parameter P on said enciphered message, r-plus operation means for performing a complementing operation of $\{X^P, I, X', X_P\}$ with respect to said parameter P on said enciphered message, fifth means, connect r-ciphertext register means to said r-star operation means through said r-switch means in order to obtain the pseudocomplement $A^{*\prime}$, where the applicable complementing operation is specified by the bits $u_1u_0$, namely the applicable operations $\{X', X^P, X_P, I\}$ for pseudocomplements $\{A^*, A^{**}, A^{*P}, A^{*\prime}\}$ respectively, sixth means, connect r-ciphertext register means to said r-plus operation means through said r-switch means in order to obtain the pseudocomplement $A^{++}$, where the applicable complementing operation is specified by the bits $v_1v_0$, namely the applicable operations $\{X^P, I, X', X_P\}$ for pseudocomplements $\{A^+, A^{++}, A^+_P, A^{+\prime}\}$ respectively.

seventh means, performing a logical OR operation on said obtained pseudocomplements $A^{*\prime}$ and $A^{++}$ forming $A = I \cdot (A^{*\prime} + A^{++})$ and storing the result in said r-plaintext register means.

7. The apparatus for communicating securely over an insecure communication medium set forth in claim 6 including:

alternative logical operations, which can result in the same logical values due to Boolean algebra operations, in three means listed below:

| said seventh means performing | applicable operations in said fifth means | applicable operations in said sixth means |
|---|---|---|
| $A = I \cdot (A^{*\prime} + A^{++})$ | $\{X', X^P, X_P, I\}$ | $\{X^P, I, X', X_P\}$ |
| $A = I \cdot (A^{**} \cdot A^{+\prime})$ | $\{X_P, I, X', X^P\}$ | $\{X', X_P, X^P, I\}$ |
| $A = (A')' = (A^{*P} + A^+)'$ | $\{X^P, X', I, X_P\}$ | $\{I, X^P, X_P, X'\}$ |
| $A = (A')' = (A^* \cdot A^+_P)'$ | $\{I, X_P, X^P, X'\}$ | $\{X_P, X', I, X^P\}$ |
| $A = (A^P)^P = (A^{*\prime} + A^+)^P$ | $\{X', X^P, X_P, I\}$ | $\{I, X^P, X_P, X'\}$ |
| $A = (A^P)^P = (A^{**} \cdot A^+_P)^P$ | $\{X_P, I, X', X^P\}$ | $\{X_P, X', I, X^P\}$ |
| $A = (A_P)_P = (A^{*P} + A^{++})_P$ | $\{X^P, X', I, X_P\}$ | $\{X^P, I, X', X_P\}$ |
| or $A = (A_P)_P = (A^* \cdot A^{+\prime})_P$ | $\{I, X_P, X^P, X'\}$ | $\{X', X_P, X^P, I\}$ |

8. The apparatus for communicating securely over an insecure communication medium set forth in claim 6 including:

physical wirings (hard wirings) of said control connections by choosing a configuration of a connecting arrangement designated by bits $u_1u_0$, $v_1v_0$ and $w_0$, instead of said control connections by said control bits, $u_1u_0$ in said first means, $v_1v_0$ in said second means, $w_0$ in said third means, $w_0$ in said fourth means, $u_1u_0$ in said fifth means, and $v_1v_0$ in said sixth means.

9. The apparatus for communicating securely over an insecure communication medium set forth in claim 6 including:

said third means replacing said plus pseudocomplement with any other bits and said fourth means replacing said star pseudocomplement with any other bits.

10. An apparatus for communicating securely over an insecure communication medium of the type which communicates a digital message A from a sender to a receiver by enciphering at said sender said digital message with two secret enciphering/deciphering parameters $P_i$ and $P_j$, by transmitting said enciphered message from said sender to said receiver, and by deciphering at the receiver's end said enciphered message with said two parameters comprising:

s-plaintext register means for receiving and storing a digital message A, first generator means for receiving and storing (i) a parameter $P_i$ and (ii) $(u_1u_0)_1$, $(v_1v_0)_1$ and $w_{01}$ of control bits $q_1$, for receiving the content of said s-plaintext register means, for enciphering said received digital message into a pair of conjugate pseudocomplements by performing conjugate pseudocomplementing operations with respect to said parameter $P_i$, and for outputting said pair of the conjugate pseudocomplements from its terminals $M_0$ and $M_1$, second generator means for receiving and storing (i) a pseudocomplement of $P_i$ with respect to $P_j$ as a parameter denoted as $P_i(P_j)$ and (ii) $(u_1u_0)_2$, $(v_1v_0)_2$ and $w_{02}$ of control bits $q_2$, for receiving the content of said s-plaintext register means, for enciphering said received digital message into a pair of conjugate pseudocomplements by performing conjugate pseudocomplementing operations with respect to said parameter $P_i(P_j)$, and for outputting said pair of the conjugate pseudocomplements from its terminals $M_0$ and $M_1$, s-selector means for receiving (i) two pairs of conjugate pseudocomplements and (ii) switching bits $w_3$ and $w_2$, and control bit $w_1$, for selectively passing said received two pairs of conjugate pseudocomplements using said switching and control bits, and for outputting a selected pair of the pseudocomplements consisting of one pseudocomplement with respect to $P_i$ and the other pseudocomplement with respect to $P_i(P_j)$, s-ciphertext register means for receiving and transmitting an enciphered message, first means, connect said s-plaintext register means to said first generator means and to said second generator means, second means, connect said terminals $M_0$ and $M_1$ of each said generator means to said s-selector means, and for passing said selected pair of pseudocomplements to said s-ciphertext register means through said s-selector means selected by ssaid bits $w_3$, $w_2$ and $w_1$, r-ciphertext register means for receiving and storing an enciphered message, r-selector means for receiving (i) said switching bits $w_3$ and $w_2$, and control bit $w_1$, and (ii) an enciphered message, for selectively passing the conjugate pseudocomplements of said enciphered message received by using said switching and control bits $w_3$, $w_2$ and $w_1$, and for outputting each of the condjugate pseudocomplements, temporary register means for receiving and storing a pair of conjugate pseudocomplements with respect to $P_i(P_j)$ obtained from said enciphered message, third generator means for receiving and storing a parameter $P_j$ and $(u_1u_0)_a$, $(v_1v_0)_a$ and $(w_0)_a$ of control bits $q_a$, for receiving and enciphering the pseudocomplement with respect to $P_i$ of the enciphered message by taking pseudocomplementing operations with respect to $P_j$, which is specified by said bits $(u_1u_0)_a$ and $(v_1v_0)_a$, and for outputting a produced pair of conjugate pseudocomplements with respect to $P_i(P_j)$, box means for receiving and passing the pseudocomplement with respect to $P_i(P_j)$ of said enciphered message to its output terminals $M_0$ and $M_1$, r-plaintext register means for receiving and storing a deciphered message as the original plaintext, switcher means for connecting two input terminals (a,b) to two output terminals (c,d) by alternatively switching said connection (a,b) to (c,d) and (a,b) to (d,c) respectively using control bit $w_i$ where i denotes the suffix of said bits $w_0$, $w_1$, $w_2$ and $w_3$, desegregator means for receiving and storing said parameter $P_i(P_j)$ and control bits $(u_1u_0)_b$, $(v_1v_0)_b$ and $(w_0)_b$ of $q_b$, for receiving and transforming said pair of conjugate pseudocomplements with respect to $P_i(P_j)$, which is the content of said temporary register means, to a targeted pair of the conjugate pseudocomplements $(A^*,A^{++})$ by performing the applicable complementing operations of $\{X',X^P,X_P,I\}$ specified by $(u_1u_0)_b$ and of $\{X^P,I,X',X_P\}$ specified by $(v_1v_0)_b$, for executing a logical OR operation on said targeted pair, which has been transformed, in order to retrieve said original plaintext, third means, connect said r-ciphertext register means to said third generator means through the first two switches of said r-selector means controlled by said bits $w_3$ and $w_2$ where said generator means generates said pair of conjugate pseudocomplements with respect to $P_j$, fourth means, connect said third generator means to said desegregator means through (i) the third switch of said r-selector means controlled by said bit $w_1$ and (ii) said temporary register means where said desegregator means produces said targeted pair of conjugate pseudocomplements using said parameter $P_i(P_j)$ and said $q_b$, fifth means, connect said r-ciphertext register means to said desegregator means through (i) the first two switches of ssaid r-selector means controlled by said bits $w_3$ and $w_2$, (ii) said box means, (iii) the third switch of said r-selector means controlled by said bit $w_1$ and (iv) said temporary register means, sixth means for transferring the deciphered message produced by executing said logical OR operation into said ciphertext register means, seventh means for obtaining (i) first pseudocomplement by performing said conjugate pseudocomplementing operations with respect to said parameter $P_i$ in said first generator means and (ii) second pseudocomplement by performing said conjugate pseudocomplementing operations with respect to said parameter $P_j$ in said third generator means where said first pseudocomplement and said second pseudocomplement are defined in the first term or the second term of an equation chosen from the equations (3-1) through (3-16), in order to acquire an objective term which is the third term or the fourth term of said chosen equation, eighth means for obtaining third pseudocomplement by performing said conjugate pseudocomplementing operations with respect to said parameter $P_i(P_j)$ in said second generator means where said third pseudocomplement with respect to said parameter $P_i(P_j)$ constitutes a conjugate pair with said objective term, where said equations (3-1) through (3-16) are $$(A^+{}_P-(P_j-)^{+'}-(P_j)- = (A^{++}-(P_j-)^{+}{}_P-(P_j)- = \\ A^+{}_P-(P_i^{++}-(P_j-)- = A^*-(P_i^{+}{}_P-(P_j)-)- \quad (3\text{-}1)$$

$$(A^+{}_P-(P_j-)^{**}-(P_j)- = (A^{++}-(P_j-)^{*}-(P_j- = \\ A^+{}_P-(P_i^{*'}-(P_j)-)- = A^*-(P_i^{*}-(P_j)-)- \quad (3\text{-}2)$$

$$(A^*-(P_j-)^{+'}-(P_j)- = (A^{*'}-(P_j-)^{+}{}_P-(P_j)- = \\ A^+{}_P-(P_i^{++}-(P_j)- = A^*-(P_i^{+'}-(P_j)-)- \quad (3\text{-}3)$$

$$(A^*-(P_j-)^{**}-(P_j)- = (A^{*'}-(P_j-)^{*}-(P_j)- = \\ A^+{}_P-(P_i^{*P}-(P_j)-)- = A^*-(P_i^{**}-(P_j)-)- \quad (3\text{-}4)$$

$$(A^{+'}-(P_j-)^{+'}-(P_j)- = (A^+-(P_j-)^{+}{}_P-(P_j)- = \\ A^{+'}-(P_i^{++}-(P_j)-- = A^{**}-(P_i^{+}{}_P-(P_j)-)- \quad (3\text{-}5)$$

$$(A^{+'}-(P_j-)^{**}-(P_j)- = (A^+-(P_j-)^{*}-(P_j)- = \\ A^{+'}-(P_i^{*'}-(P_j)-)- = A^{**}-(P_i^{*}-(P_j)-)- \quad (3\text{-}6)$$

$$(A^{**}-(P_j-)^{+'}-(P_j)- = (A^{*P}-(P_j-)^{+}{}_P-(P_j)- = \\ A^{+'}-(P_i^{+}-(P_j)-)- = A^{**}-(P_i^{+'}-(P_j)-)- \quad (3\text{-}7)$$

$$(A^{}-(P_j-)^{}-(P_j)- = (A^{*P}-(P_j-)^{*}-(P_j)- = \\ A^{+'}-(P_i^{*P}-(P_j)-)- = A^{}-(P_i^{}-(P_j)-)- \quad (3\text{-}8)$$

$$(A^{*P}-(P_j-)^{*'}-(P_j)- = (A^{**}-(P_j-)^{*P}-(P_j)- = \\ A^+-(P_i^{*P}-(P_j)-)- = A^{*P}-(P_i^{**}-(P_j)-)- \quad (3\text{-}9)$$

$$(A^{*P}-(P_j-)^{++}-(P_j)- = (A^{**}-(P_j-)^{+}-(P_j)- = \\ A^+-(P_i^{+}-(P_j)-)- = A^{*P}-(P_i^{+'}-(P_j)-)- \quad (3\text{-}10)$$

$$(A^+-(P_j-)^{*'}-(P_j)- = (A^{+'}-(P_j-)^{*P}-(P_j)- = \\ A^+-(P_i^{*'}-(P_j)-)- = A^{*P}-(P_i^{*}-(P_j)-)- \quad (3\text{-}11)$$

$$(A^+-(P_j-)^{++}-(P_j)- = (A^{+'}-(P_j-)^{+}-(P_j)- = \\ A^+-(P_i^{++}-(P_j)-)- = A^{*P}-(P_i^{+}{}_P-(P_j)-)- \quad (3\text{-}12)$$

$$(A^{*'}-(P_j-)^{*'}-(P_j)- = (A^*-(P_j-)^{*P}-(P_j)- = \\ A^{++}-(P_i^{*P}-(P_j)-)- = A^{*'}-(P_i^{**}-(P_j)-)- \quad (3\text{-}13)$$

$$(A^{*'}-(P_j-)^{++}-(P_j)- = (A^*-(P_j-)^{+}-(P_j)- = \\ A^{++}-(P_i^{+}-(P_j)-)- = A^{*'}-(P_i^{+'}-(P_j)-)- \quad (3\text{-}14)$$

$$(A^{++}-(P_j-)^{*'}-(P_j)- = (A^+{}_P-(P_j-)^{*P}-(P_j)- = \\ A^{++}-(P_i^{*'}-(P_j)-)- = A^{*'}-(P_i^{*}-(P_j)-)- \quad (3\text{-}15)$$

$$(A^{++}-(P_j-)^{++}-(P_j)- = (A^+{}_P-(P_j-)^{+}-(P_j)- = \\ A^{++}-(P_i^{++}-(P_j)-)- = A^{*'}-(P_i^{+}{}_P-(P_j)-)-. \quad (3\text{-}16)$$

11. The apparatus for communicating securely over an insecure communication medium set forth in claim 10 including:

alternative logical operations applicable to said complementations specified by $u_1 u_0$ and $v_1 v_0$ in said desegregator means can result in the same logical values due to Boolean algebra operations, these operations are

| logical operation | complementation specified by $u_1 u_0$ | complementation specified by $v_1 v_0$ |
|---|---|---|
| $A = I \cdot (A^{*\prime} + A^{++})$ | $\{X', X^P, X_P, I\}$ | $\{X^P, I, X', X_P\}$ |
| $A = I \cdot (A^{**} \cdot A^{+\prime})$ | $\{X_P, I, X', X^P\}$ | $\{X', X_P, X^P, I\}$ |
| $A = (A')' = (A^{*P} + A^{+})'$ | $\{X^P, X', I, X_P\}$ | $\{I, X^P, X_P, X'\}$ |
| $A = (A')' = (A^{*} \cdot A^{+}{}_P)'$ | $\{I, X_P, X^P, X'\}$ | $\{X_P, X', I X^P\}$ |
| $A = (A^P)^P = (A^{*\prime} + A^{+})^P$ | $\{X', X^P, X_P I\}$ | $\{I,, X^P, X_P, X'\}$ |
| $A = (A^P)^P (A^{**} \cdot A^{+}{}_P)^P$ | $\{X_P, I, X', X^P\}$ | $\{X_P, X', I, X^P\}$ |
| $A = (A_P)_P = (A^{*P} + A^{++})_P$ | $\{X^P, X', I, X_P\}$ | $\{X^P, I, X', X_P\}$ |
| or | | |
| $A = (A_P)_P = (A^{*} \cdot A^{+\prime})_P$ | $\{I, X_P, X^P, X'\}$ | $\{X', X_P, X^P, I\}$ |

12. The apparatus for communicating securely over an insecure communication medium set forth in claim 10 including:

said parameters $P_i$ and $P_j$ are interchangeable, namely $P_i$ can be used in the place of $P_j$ and $P_j$ can be used in the place of $P_i$.

13. In a process for communicating securely over an insecure communication medium of the type which communicates a digital message A from a sender to a receiver by enciphering at said sender said digital message using two compound parameters $Q_1 = P_j(P_k)$ and $Q_2 = P_i(P_j)$, which are kept in secret or which are open to general public, constructed by pseudocomplementing operations from three parameters $P_i$, $P_j$ and $P_k$, by transmitting said enciphered message from said sender to said receiver, and by deciphering at the receiver's end said enciphered message using said parameter $P_i$ and a third compound parameter $Q_3 = P_i(P_k)$ constructed from said parameters $P_i$ and $P_k$ where applicable pseudocomplementing operations that define the pseudocomplements of $Q_1 = P_j(P_k)$, $Q_2 = P_i(P_j)$ and $Q_3 = P_i(P_k)$ as well as $P_1(Q_1) = Q_2(Q_3) = Q_1(P_1)$ and $P_1 = P_i$ are determined in first equation selected among the equations (6-1) through (6-16) which are

| $P_1(Q_1)$ | $Q_2(Q_3)$ | $Q_1(P_1)$ | |
|---|---|---|---|
| $P_i{}^+-(P_j{}^+{}_P-(P_k)-)- =$ | | | (6-1) |
| $(P_i{}^{*P}-(P_j)-)^{**}-(P_i{}^{*P}-(P_k)-)- =$ | | | |
| $(P_j{}^+{}_P-(P_k)-)^{*\prime}-(P_j)-$ | | | |
| $P_i{}^+-(P_j{}^*-(P_k)-)- =$ | | | (6-2) |
| $(P_i{}^{*P}-(P_j)-)^{**}-(P_i{}^+-(P_k)-)- =$ | | | |
| $(P_j{}^*-(P_k)-)^{*\prime}-(P_j)-$ | | | |
| $P_i{}^+-(P_j{}^{+\prime}-(P_k)-)- =$ | | | (6-3) |
| $(P_i{}^+-(P_j)-)^{**}-(P_i{}^{*P}-(P_k)-)- =$ | | | |
| $(P_j{}^{+\prime}-(P_k)-)^{*\prime}-(P_j)-$ | | | |
| $P_i{}^+-(P_j{}^{**}-(P_k)-)- =$ | | | (6-4) |
| $(P_i{}^+-(P_j)-)^{**}-(P_i{}^+-(P_k)-)- =$ | | | |
| $(P_j{}^{**}-(P_k)-)^{*\prime}-(P_j)-$ | | | |
| $P_i{}^{++}-(P_j{}^+{}_P-(P_k)-)- =$ | | | (6-5) |
| $(P_i{}^{*\prime}-(P_j)-)^{**}-(P_i{}^{*\prime}-(P_k)-)- =$ | | | |
| $(P_j{}^+{}_P-(P_k)-)^{++}-(P_j)-$ | | | |

| $P_1(Q_1)$ | $Q_2(Q_3)$ | $Q_1(P_1)$ | |
|---|---|---|---|
| $P_i{}^{++}-(P_j{}^*-(P_k)-)- =$ | | | (6-6) |
| $(P_i{}^{*\prime}-(P_j)-)^{**}-(P_i{}^{++}-(P_k)-)- =$ | | | |
| $(P_j{}^*-(P_k)-)^{++}-(P_j)-$ | | | |
| $P_i{}^{++}-(P_j{}^{+\prime}-(P_k)-)- =$ | | | (6-7) |
| $(P_i{}^{++}-(P_j)-)^{**}-(P_i{}^{*\prime}-(P_k)-)- =$ | | | |
| $(P_j{}^{+\prime}-(P_k)-)^{++}-(P_j)-$ | | | |
| $P_i{}^{++}-(P_j{}^{**}-(P_k)-)- =$ | | | (6-8) |
| $(P_i{}^{++}-(P_j)-)^{**}-(P_i{}^{++}-(P_k)-)- =$ | | | |
| $(P_j{}^{**}-(P_k)-)^{++}-(P_j)-$ | | | |
| $P_i{}^*-(P_j{}^*{}^P-(P_k)-)- =$ | | | (6-9) |
| $(P_k{}^+{}_P-(P_j)-)^{++}-(P_i{}^+{}_P-(P_k)-)- =$ | | | |
| $(P_j{}^{*P}-(P_k)-)^{+\prime}-(P_j)-$ | | | |
| $P_i{}^*-(P_j{}^+-(P_k)-)- =$ | | | (6-10) |
| $(P_i{}^+{}_P-(P_j)-)^{++}-(P_i{}^*-(P_k)-)- =$ | | | |
| $(P_j{}^+-(P_k)-)^{+\prime}-(P_j)-$ | | | |
| $P_i{}^*-(P_j{}^{*\prime}-(P_k)-)- =$ | | | (6-11) |
| $(P_i{}^*-(P_j)-)^{++}-(P_i{}^+{}_P-(P_k)-)- =$ | | | |
| $(P_j{}^{*\prime}-(P_k)-)^{+\prime}-(P_j)-$ | | | |
| $P_i{}^*-(P_j{}^{++}-(P_k)-)- =$ | | | (6-12) |
| $(P_i{}^*-(P_j)-)^{++}-(P_i{}^*-(P_k)-)- =$ | | | |
| $(P_j{}^{++}-(P_k)-)^{+\prime}-(P_j)-$ | | | |
| $P_i{}^{**}-(P_j{}^{*P}-(P_k)- =$ | | | (6-13) |
| $(P_i{}^{+\prime}-(P_j)-)^{++}-(P_i{}^{+\prime}-(P_k)-)- =$ | | | |
| $(P_j{}^{*P}-(P_k)-)^{**}-(P_j)-$ | | | |
| $P_i{}^{**}-(P_j{}^+-(P_k)-)- =$ | | | (6-14) |
| $(P_i{}^{+\prime}-(P_j)-)^{++}-(P_i{}^{**}-(P_k)-)- =$ | | | |
| $(P_j{}^+-(P_k)-)^{**}-(P_j)-$ | | | |
| $P_i{}^{**}-(P_j{}^{*\prime}-(P_k)-)- =$ | | | (6-15) |
| $(P_i{}^{**}-(P_j)-)^{++}-(P_i{}^{+\prime}-(P_k)-)- =$ | | | |
| $(P_j{}^{*\prime}-(P_k)-)^{**}-(P_j)-$ | | | |
| $P_i{}^{**}-(P_j{}^{++}-(P_k)-)- =$ | | | (6-16) |
| $(P_i{}^{}-(P_j)-)^{++}-(P_i{}^{}-(P_k)-)- =$ | | | |
| $(P_j{}^{++}-(P_k)-)^{**}-(P_j)-$ | | | | the process characterized in that said sender means includes means for receiving and storing said two compound parameters $Q_1$ and $Q_2$; means for receiving and enciphering said digital message by applying two conjugate pseudocomplementing operations (i) with respect to said compound parameter $Q_1$ and (ii) with respect to said compound parameter $Q_2$ where by electing (i) second equation from four equations which are chosen from the equations (3-1) through (3-16) by collecting the pseudocomplement terms with respect to said parameter $Q_1(P_1)$ (that is also appeared in said first equation) in the third term of the fourth term after substituting $Q_1$ and $P_1$ in the places of $P_i$ and $P_j$ of the equations (3-1) through (3-16) and (ii) third equation from four equations which are chosen from the equations (3-1) through (3-16) by collecting the pseudocomplement terms with respect to said parameter $Q_2(Q_3)$ (that is also appeared in said first equation) in the third term or the fourth term after substituting $Q_2$ and $Q_3$ in the places of $P_i$ and $P_j$ of the equations (3-1) through (3-16), the first term or the second term of the pseudocomplement with respect to $Q_1$ of said second equation and the first term or the second term of the pseudocomplement with respect to $Q_2$ of said third equation specify said applicable two conjugate pseudocomplementing operations, respectively, $$
\begin{aligned}
(A^+{}_P\text{-}(P_j\text{-})^{+\prime}\text{-}(P_j\text{-}) &= (A^{++}\text{-}(P_j\text{-})^+{}_P\text{-}(P_j\text{-}) = A^+{}_P\text{-}(P_i^{++}\text{-}(P_j\text{-})\text{-} = A^*\text{-}(P_i^+{}_P\text{-}(P_j\text{-})\text{-} && (3\text{-}1)\\
(A^+{}_P\text{-}(P_j\text{-})^{**}\text{-}(P_j\text{-}) &= (A^{++}\text{-}(P_j\text{-})^*\text{-}(P_j\text{-}) = A^+{}_P\text{-}(P_i^{*\prime}\text{-}(P_j\text{-})\text{-} = A^*\text{-}(P_i^*\text{-}(P_j\text{-})\text{-} && (3\text{-}2)\\
(A^*\text{-}(P_j\text{-})^{+\prime}\text{-}(P_j\text{-}) &= (A^{*\prime}\text{-}(P_j\text{-})^+{}_P\text{-}(P_j\text{-}) = A^+{}_P\text{-}(P_i^{+\prime}\text{-}(P_j\text{-})\text{-} = A^*\text{-}(P_i^{+\prime}\text{-}(P_j\text{-})\text{-} && (3\text{-}3)\\
(A^*\text{-}(P_j\text{-})^{**}\text{-}(P_j\text{-}) &= (A^{*\prime}\text{-}(P_j\text{-})^*\text{-}(P_j\text{-}) = A^+{}_P\text{-}(P_i^{*P}\text{-}(P_j\text{-})\text{-} = A^*\text{-}(P_i^{**}\text{-}(P_j\text{-})\text{-} && (3\text{-}4)\\
(A^{+\prime}\text{-}(P_j\text{-})^{+\prime}\text{-}(P_j\text{-}) &= (A^+\text{-}(P_j\text{-})^+{}_P\text{-}(P_j\text{-}) = A^{+\prime}\text{-}(P_i^{++}\text{-}(P_j\text{-})\text{-} = A^{**}\text{-}(P_i^+{}_P\text{-}(P_j\text{-})\text{-} && (3\text{-}5)\\
(A^{+\prime}\text{-}(P_j\text{-})^{**}\text{-}(P_j\text{-}) &= (A^+\text{-}(P_j\text{-})^*\text{-}(P_j\text{-}) = A^{+\prime}\text{-}(P_i^{*\prime}\text{-}(P_j\text{-})\text{-} = A^{**}\text{-}(P_i^*\text{-}(P_j\text{-})\text{-} && (3\text{-}6)\\
(A^{**}\text{-}(P_j\text{-})^{+\prime}\text{-}(P_j\text{-}) &= (A^{*P}\text{-}(P_j\text{-})^+{}_P\text{-}(P_j\text{-}) = A^{+\prime}\text{-}(P_i^{+\prime}\text{-}(P_j\text{-})\text{-} = A^{**}\text{-}(P_i^{+\prime}\text{-}(P_j\text{-})\text{-} && (3\text{-}7)\\
(A^{}\text{-}(P_j\text{-})^{}\text{-}(P_j\text{-}) &= (A^{*P}\text{-}(P_j\text{-})^*\text{-}(P_j\text{-}) = A^{+\prime}\text{-}(P_i^{*P}\text{-}(P_j\text{-})\text{-} = A^{}\text{-}(P_i^{}\text{-}(P_j\text{-})\text{-} && (3\text{-}8)\\
(A^{*P}\text{-}(P_j\text{-})^*\text{-}(P_j\text{-}) &= (A^{**}\text{-}(P_j\text{-})^{*P}\text{-}(P_j\text{-}) = A^+\text{-}(P_i^{*P}\text{-}(P_j\text{-})\text{-} = A^{*P}\text{-}(P_i^{**}\text{-}(P_j\text{-})\text{-} && (3\text{-}9)\\
(A^{*P}\text{-}(P_j\text{-})^{++}\text{-}(P_j\text{-}) &= (A^{**}\text{-}(P_j\text{-})^+\text{-}(P_j\text{-}) = A^+\text{-}(P_i^{+\prime}(P_j\text{-})\text{-} = A^{*P}\text{-}(P_i^{+\prime}\text{-}(P_j\text{-})\text{-} && (3\text{-}10)\\
(A^+\text{-}(P_j\text{-})^{*\prime}\text{-}(P_j\text{-}) &= (A^{+\prime}\text{-}(P_j\text{-})^{*P}\text{-}(P_j\text{-}) = A^+\text{-}(P_i^{*\prime}\text{-}(P_j\text{-})\text{-} = A^{*P}\text{-}(P_i^*\text{-}(P_j\text{-})\text{-} && (3\text{-}11)\\
(A^+\text{-}(P_j\text{-})^{++}\text{-}(P_j\text{-}) &= (A^{+\prime}\text{-}(P_j\text{-})^+\text{-}(P_j\text{-}) = A^+\text{-}(P_i^{++}\text{-}(P_j\text{-})\text{-} = A^{*P}\text{-}(P_i^+{}_P\text{-}(P_j\text{-})\text{-} && (3\text{-}12)\\
(A^{*\prime}\text{-}(P_j\text{-})^*\text{-}(P_j\text{-}) &= (A^*\text{-}(P_j\text{-})^{*P}\text{-}(P_j\text{-}) = A^{++}\text{-}(P_i^{*P}\text{-}(P_j\text{-})\text{-} = A^{*\prime}\text{-}(P_i^{**}\text{-}(P_j\text{-})\text{-} && (3\text{-}13)\\
(A^{*\prime}\text{-}(P_j\text{-})^{++}\text{-}(P_j\text{-}) &= (A^*\text{-}(P_j\text{-})^+\text{-}(P_j\text{-}) = A^{++}\text{-}(P_i^+\text{-}(P_j\text{-})\text{-} = A^{*\prime}\text{-}(P_i^{+\prime}\text{-}(P_j\text{-})\text{-} && (3\text{-}14)\\
(A^{++}\text{-}(P_j\text{-})^*\text{-}(P_j\text{-}) &= (A^+{}_P\text{-}(P_j\text{-})^{*P}\text{-}(P_j\text{-}) = A^{++}\text{-}(P_i^{*\prime}\text{-}(P_j\text{-})\text{-} = A^{*\prime}\text{-}(P_i^*\text{-}(P_j\text{-})\text{-} && (3\text{-}15)\\
(A^{++}\text{-}(P_j\text{-})^{++}\text{-}(P_j\text{-}) &= (A^+{}_P\text{-}(P_j\text{-})^+\text{-}(P_j\text{-}) = A^{++}\text{-}(P_i^{++}\text{-}(P_j\text{-})\text{-} = A^{*\prime}\text{-}(P_i^+{}_P\text{-}(P_j\text{-})\text{-} && (3\text{-}16);
\end{aligned}
$$

means for forming said enciphered message consisting of pseudocomplements of a conjugate pair constructed from (i) said pseudocomplement with respect to $Q_1$ in the first term or the second term of said second equation and (ii) said pseudocomplement with respect to $Q_2$ in the first term or the second term of said third equation by considering the conjugateness between (i) a star or plus pseudocomplement of A with respect to $Q_1(P_1)$ appeared in the third term or the fourth term of said second equation and (ii) a star or plus pseudocomplement of A with respect to $Q_2(Q_3)$ appeared in the third term or the fourth term of said third equation; and means for transmitting said enciphered message to said receiver;

said receiver means includes means for receiving storing said enciphered message received by said receiver; means for performing two receiver-pseudocomplementing operations (i) with respect to $P_1$ specified in the first term or the second term of said second equation in order to acquire the third term or the fourth term which is the pseudocomplement with respect to $Q_1(P_1)$ and (ii) with respect to $Q_3$ specified in the first term or the second term of said third equation in order to acquire the third term or the fourth term which is the pseudocomplement with respect to $Q_2(Q_3)$; means for transforming a pair consisting of said acquired third term or fourth term of said second equation and said acquired third term or the fourth term of said third equation into a targeted pair of $\{(A^{*\prime},A^{++}),$ $(A^{**},A^{+\prime}),(A^{*P},A^+),(A^*,A^+{}_P),(A^{*\prime},A^+),(A^{**}\text{-},A^+{}_P),(A^{*P},A^{++}),(A^*,A^{+\prime})\}$ with respect to said parameter $Q_1(P_1)=Q_2(Q_3)$ by performing necessary Boolean algebra operations of $\{X_P,X^\prime,X^P,I\}$; and means for combining the star pseudocomplement and the plus pseudocomplement of said targeted pair by a logical AND or a logical OR operation which achieves $A = A^{**} \cdot A^+ = A^{*\prime} + A^{++}$, $A^\prime = A^* \cdot A^+{}_P = A^{*P} + A^+$, $A^P = A^{**} \cdot A^+{}_P = A^{*\prime} + A^+$, or $A_P = A^* \cdot A^{+\prime} = A^{*P} + A^+$ in order to retrieve a deciphered message of $\{A, A^\prime, A^P, A_P\}$ and to convert said deciphered message into said original digital message A by applying a respective operation of $\{I, X^\prime, X_P, X^P\}$, respectively;

said conjugate pseudocomplementing operations include means for transforming a digital message received by said sender and an enciphered message received by said receiver into two conjugate sets of a pair consisting of a star pseudocomplement of $\{A^*, A^{**}, A^{*P}, A^{*\prime}\}$ by applying an operation of $\{X^*, X^{**}, X^{*P}, X^{*\prime}\}$ and a plus pseudocomplement of $\{A^+, A^{++}, A^+{}_P, A^{+\prime}\}$ by applying an operation of $\{X^+, X^{++}, X^+{}_P, X^{+\prime}\}$, respectively, (i) with respect to said parameter $Q_1$ or $P_1$ and (ii) with respect to said parameter $Q_2$ or $Q_3$.

14. The process for communicating securely over an insecure communication medium set forth in claim 13 including:

said necessary Boolean algebra operations for performing a transformation operation, which is indicated at the intersection of the table below, from a present pseudocomplement in the leftmost column to a targeted pseudocomplement in the top row,

| Star pseudocomplement | | | | | Plus pseudocomplement | | | |
|---|---|---|---|---|---|---|---|---|
| | to | | | | | to | | |
| from | * | ** | *P | *′ | from | + | ++ | +P | +′ |
| * | I | $X_P$ | $X^P$ | $X^\prime$ | + | I | $X^P$ | $X_P$ | $X^\prime$ |
| ** | $X_P$ | I | $X^\prime$ | $X^P$ | ++ | $X^P$ | I | $X^\prime$ | $X_P$ |
| *P | $X^P$ | $X^\prime$ | I | $X_P$ | +P | $X_P$ | $X^\prime$ | I | $X^P$ |
| *′ | $X^\prime$ | $X^P$ | $X_P$ | I | +′ | $X^\prime$ | $X_P$ | $X^P$ | I |

15. The process for communicating securely over an insecure communication medium set forth in claim 13 including:

said parameters $P_i$, $P_j$ and $P_k$ are interchangeable, namely changing placed with each other.

16. An apparatus for communicating securely over an insecure communication medium of the type which communicates a digital message A from a sender to a receiver by enciphering at said sender said digital message with two compound parameters $Q_1 = P_j(P_k)$ and $Q_2 = P_i(P_j)$, which are kept in secret or which are open to general public, constructed from three parameters, $P_i$, $P_j$ and $P_k$, by transmitting said enciphered message from said sender to said receiver, by deciphering at the receiver's end said enciphered message using said parameter $P_i(=P_1)$ and a third compound parameter $Q_3 = P_i(P_k)$, which are kept in secret, constructed from said three parameters where applicable pseudocomplementing operations that define the pseudocomplements of $Q_1 = P_j(P_k)$, $Q_2 = P_i(P_j)$ and $Q_3 = P_i(P_k)$ as well as relationships $P_1(Q_1) = Q_2(Q_3) = Q_1(P_1)$ and $P_1 = P_i$ are determined in first equation selected among the equations (6-1) through (6-16) which are

| $P_1(Q_1)$ | $Q_2(Q_3)$ | $Q_1(P_1)$ |
|---|---|---|
| $P_i^+\text{-}(P_j^+{}_P\text{-}(P_k\text{-})\text{-})\text{-} =$ | | (6-1) |
| | $(P_i^{*P}\text{-}(P_j\text{-})\text{-})^{**}\text{-}(P_i^{*P}\text{-}(P_k\text{-})\text{-} =$ | |
| | | $(P_j^+{}_P\text{-}(P_k\text{-})\text{-})^{*\prime}\text{-}(P_j\text{-})\text{-}$ |
| $P_i^+\text{-}(P_j^*\text{-}(P_k\text{-})\text{-})\text{-} =$ | | (6-2) |
| | $(P_i^{*P}\text{-}(P_j\text{-})\text{-})^{**}\text{-}(P_i^+\text{-}(P_k\text{-})\text{-})\text{-} =$ | |

-continued

| $P_1(Q_1)$ | $Q_2(Q_3)$ | $Q_1(P_1)$ |
|---|---|---|
| | | $(P_j*-(P_k)-)*'-(P_j)-$ |

$$P_i{+}{-}(P_j{+}'{-}(P_k)-)- = \qquad (6\text{-}3)$$
$$(P_i{+}{-}(P_j)-)**{-}(P_i*^P{-}(P_k)-)- =$$
$$(P_j{+}'{-}(P_k)-)*'{-}(P_j)-$$

$$P_i{+}{-}(P_j**{-}(P_k)-)- = \qquad (6\text{-}4)$$
$$(P_i{+}{-}(P_j)-)**{-}(P_i{+}{-}(P_k)-)- =$$
$$(P_j**{-}(P_k)-)*'{-}(P_j)-$$

$$P_i{+}{+}{-}(P_j{+}_P{-}(P_k)-)- = \qquad (6\text{-}5)$$
$$(P_i{*'}{-}(P_j)-)**{-}(P_i{*'}{-}(P_k)-)- =$$
$$(P_j{+}_P{-}(P_k)-){+}{+}{-}(P_j)-$$

$$P_i{+}{+}{-}(P_j*{-}(P_k)-)- = \qquad (6\text{-}6)$$
$$(P_i{*'}{-}(P_j)-)**{-}(P_i{+}{+}{-}(P_k)-)- =$$
$$(P_j*{-}(P_k)-){+}{+}{-}(P_j)-$$

$$P_i{+}{+}{-}(P_j{+}'{-}(P_k)-)- = \qquad (6\text{-}7)$$
$$(P_i{+}{+}{-}(P_j)-)**{-}(P_i{*'}{-}(P_k)-)- =$$
$$(P_j{+}'{-}(P_k)-){+}{+}{-}(P_j)-$$

$$P_i{+}{+}{-}(P_j**{-}(P_k)-)- = \qquad (6\text{-}8)$$
$$(P_i{+}{+}{-}(P_j)-)**{-}(P_i{+}{+}{-}(P_k)-)- =$$
$$(P_j**{-}(P_k)-){+}{+}{-}(P_j)-$$

$$P_i*{-}(P_j*^P{-}(P_k)-)- = \qquad (6\text{-}9)$$
$$(P_k{+}_P{-}(P_j)-){+}{+}{-}(P_i{+}_P{-}(P_k)-)- =$$
$$(P_j*^P{-}(P_k)-){+}'{-}(P_j)-$$

$$P_i*{-}(P_j{+}{-}(P_k)-)- = \qquad (6\text{-}10)$$
$$(P_i{+}_P{-}(P_j)-){+}{+}{-}(P_i*{-}(P_k)-)- =$$
$$(P_j{+}{-}(P_k)-){+}'{-}(P_j)-$$

$$P_i*{-}(P_j{*'}{-}(P_k)-)- = \qquad (6\text{-}11)$$
$$(P_i*{-}(P_j)-){+}{+}{-}(P_i{+}_P{-}(P_k)-)- =$$
$$(P_j{*'}{-}(P_k)-){+}'{-}(P_j)-$$

$$P_i*{-}(P_j{+}{+}{-}(P_k)-)- = \qquad (6\text{-}12)$$
$$(P_i*{-}(P_j)-){+}{+}{-}(P_i*{-}(P_k)-)- =$$
$$(P_j{+}{+}{-}(P_k)-){+}'{-}(P_j)-$$

$$P_i**{-}(P_j*^P{-}(P_k)- = \qquad (6\text{-}13)$$
$$(P_i{+}'{-}(P_j)-){+}{+}{-}(P_i{+}'{-}(P_k)-)- =$$
$$(P_j*^P{-}(P_k)-)**{-}(P_j)-$$

$$P_i**{-}(P_j{+}{-}(P_k)-)- = \qquad (6\text{-}14)$$
$$(P_i{+}'{-}(P_j)-){+}{+}{-}(P_i**{-}(P_k)-)- =$$
$$(P_j{+}{-}(P_k)-)**{-}(P_j)-$$

$$P_i**{-}(P_j{*'}{-}(P_k)-)- = \qquad (6\text{-}15)$$
$$(P_i**{-}(P_j)-){+}{+}{-}(P_i{+}'{-}(P_k)-)- =$$
$$(P_j{*'}{-}(P_k)-)**{-}(P_j)-$$

$$P_i**{-}(P_j{+}{+}{-}(P_k)-)- = \qquad (6\text{-}16)$$
$$(P_i{-}(P_j)-){+}{+}{-}(P_i{-}(P_k)-)- =$$
$$(P_j{+}{+}{-}(P_k)-)**{-}(P_j)-$$

comprising:

s-plaintext register means for receiving and storing a digital message A, first generator means for receiving and storing (i) said compound parameter $Q_1$ and (ii) $(u_1u_0)_1$, $(v_1v_0)_1$ and $w_{01}$ of control bits $q_1$, for receiving the content of said s-plaintext register means, for enciphering said received digital message into a pair of conjugate pseudocomplements by performing conjugate pseudocomplementing operations with respect to said parameter $Q_1$, and for outputting said pair of the conjugate pseudocomplements from its terminals $M_0$ and $M_1$, second generator means for receiving and storing (i) said compound parameter $Q_2$ and (ii) $(u_1u_0)_2$, $(v_1v_0)_2$ and $w_{02}$ of control bits $q_2$, for receiving the content of said s-plaintext register means, for enciphering said received digital message into a pair of conjugate pseudocomplements by performing conjugate pseudocomplementing operations with respect to said parameter $Q_2$, and for outputting said pair of the conjugate pseudocomplements from its terminals $M_0$ and $M_1$, s-selector means for receiving (i) two pairs of conjugate pseudocomplements and (ii) switching bits $w_3$ and $w_2$, and control bit $w_1$, for selectively passing said received two pairs of conjugate pseudocomplements using said switching and control bits, and for outputting a selected pair of the pseudocomplements consisting of one pseudocomplement with respect to $Q_1$ and the other pseudocomplement with respect to $Q_2$, s-ciphertext register means for receiving and transmitting an enciphered message, first means, connect said s-plaintext register means to said first generator means and to said second generator means, second means, connect said terminals $M_0$ and $M_1$ of each said generator means to said s-selector means, and for passing said selected pair of the pseudocomplements to said s-ciphertext register means through said s-selector means selected by said bits $w_3$, $w_2$ and $w_1$, r-ciphertext register means for receiving and storing an enciphered message, r-selector means for receiving (i) said switching bits $w_3$ and $w_2$, and control bit $w_1$, and (ii) an enciphered message, for selectively passing the conjugate pseudocomplements of said enciphered message received using said switching and control bits $w_3$, $w_2$ and $w_1$, and for outputting each of the conjugate pseudocomplements, temporary register means for receiving and storing a pair of conjugate pseudocomplements with respect to $Q_2(Q_3)$ obtained from said enciphered message, third generator means for receiving and storing said parameter $P_i(=P_1)$ and $(u_1u_0)_a$, $(v_1v_0)_a$ and $(w_0)_a$ of control bits $q_a$, for receiving and enciphering the pseudocomplement with respect to $Q_1$ of said enciphered message by taking pseudocomplementing operations with respect to $P_i(=P_1)$, which is specified by said bits $(u_1u_0)_a$, $(v_1v_0)_a$, and for outputting a produced pair of conjugate pseudocomplements with respect to $Q_1(P_1)=Q_2(Q_3)$, fourth generator means for receiving and storing said compound parameter $Q_3$ and $(u_1u_0)_3$, $(v_1v_0)_3$ and $(w_0)_3$ of control bits $q_3$, for receiving and enciphering the pseudocomplement with respect to $Q_2$ of said enciphered message by taking pseudocomplementing operations with respect to $Q_3$, which is specified by said $(u_1u_0)_3$ and $(v_1v_0)_3$, and for outputting a produced pair of conjugate pseudocomplements with respect to $Q_2(Q_3)=Q_1(P_1)$, r-plaintext register means for receiving and storing a deciphered message as the original plaintext, switcher means for connecting two input terminals (a,b) to two output terminals (c,d) by alternatively switching said connection (a,b) to (c,d) and (a,b) to (d,c) respectively using control bit $w_i$ where i denotes the suffix of said bits $w_0$, $w_1$, $w_2$ and $w_3$, desegregator means for receiving and storing said compound parameter $Q_2(Q_3)=Q_1(P_1)$ and control bits $(u_1u_0)_b$, $(v_1v_0)_b$ and $(w_0)_b$ of $q_b$, for receiving and transforming said pair of conjugate pseudocomplements with respect to $Q_2(Q_3)$, which is the content of said temporary register means, to a targeted pair of the conjugate pseudocomplements $(A^{*\prime}, A^{++})$ by performing the applicable complementing operations of $\{X', X^P, X_P, I\}$ specified by $(u_1 u_0)_b$ and of $\{X^P, I, X', X_P\}$ specified by $(v_1 v_0)_b$, and for executing a logical OR operation on said targeted pair, which has been transformed, in order to retrieve said digital message, third means, connect said r-ciphertext register means to said third generator means through the first two switches of said r-selector means controlled by said bits $w_3$ and $w_2$ where said generator means generates said pair of conjugate pseudocomplements with respect to $P_1$, fourth means, connect said third generator means to said desegregator means through (i) the third switch of said r-selector means controlled by said bit $w_1$ and (ii) said temporary register means where said desegregator means produces said targeted pair of conjugate pseudocomplements using said parameter $Q_2(Q_3) = Q_1(P_1)$ and said $q_b$, fifth means, connect said fourth generator means to said desegregator means through (i) the third switch of said r-selector means controlled by said bit $w_1$ and (ii) said temporary register means where said desegregator means produced said targeted pair of conjugate pseudocomplements using said parameter $Q_2(Q_3) = Q_1(P_1)$ and said $q_3$, sixth means for transferring the deciphered message produced by executing said logical OR operation into said ciphertext register means, seventh means for obtaining (i) first pseudocomplement by performing said conjugate pseudocomplementing operations with respect to said compound parameter $Q_1$ in said first generator means and (ii) third pseudocomplement by performing said conjugate pseudocomplementing operations with respect to said parameter $P_1$ in said third generator means where said first pseudocomplement and said third pseudocomplement are defined in the first term or the second term of said second equation chosen from the equations (3-1) through (3-16), in order to acquire first objective term which is the third term or the fourth term of said chosen second equation, eighth means for obtaining (i) second pseudocomplement by performing said conjugate pseudocomplementing operations with respect to said compound parameter $Q_2$ in said second generator means and (ii) fourth pseudocomplement by performing said conjugate pseudocomplementing operations with respect to said compound parameter $Q_3$ in said fourth generator means where said second pseudocomplement and said fourth pseudocomplement are defined in the first term or the second term of said third equation chosen from the equations (3-1) through (3-16), in order to acquire second objective term which is the third term or the fourth term of said chosen third equation, ninth means for obtaining said conjugate pair of pseudocomplements with respect to said compound parameter $Q_2(Q_3) = Q_1(P_1)$ from said first objective term and said second objective term, where said equations (3-1) through (3-16) are $(A(Q_1))(P_1)$ or $(A(Q_2))(Q_3)$ $A(Q_1(P_1))$ or $A(Q_2(Q_3))$ $$(A+_P-(P_j)-)+'-(P_j)- = (A++-(P_j)-)+_P-(P_j)- = \atop A+_P-(P_i++-(P_j)-)- = A*-(P_i+_P-(P_j)-)- \quad (3\text{-}1)$$

$$(A+_P-(P_j)-)**-(P_j)- = (A++-(P_j)-)*-(P_j)- = \atop A+_P-(P_i*'-(P_j)-)- = A*-(P_i*-(P_j)-)- \quad (3\text{-}2)$$

$$(A*-(P_j)-)+'-(P_j)- = (A*'-(P_j)-)+_P-(P_j)- = \atop A+_P-(P_i+-(P_j)-)- = A*-(P_i+'-(P_j)-)- \quad (3\text{-}3)$$

$$(A*-(P_j)-)**-(P_j)- = (A*'-(P_j)-)*-(P_j)- = \atop A+_P-(P_i*^P-(P_j)-)- = A*-(P_i**-(P_j)-)- \quad (3\text{-}4)$$

$$(A+'-(P_j)-)+'-(P_j)- = (A+-(P_j)-)+_P-(P_j)- = \atop A+'-(P_i++-(P_j)-)- = A**-(P_i+_P-(P_j)-)- \quad (3\text{-}5)$$

$$(A+'-(P_i-)**-(P_j)- = (A+-(P_j)-)*-(P_j)- = \atop A+'-(P_i*'-(P_j)-)- = A**-(P_i*-(P_j)-)- \quad (3\text{-}6)$$

$$(A**-(P_j)-)+'-(P_j)- = (A*^P-(P_j)-)+_P-(P_j)- = \atop A+'-(P_i+-(P_j)-)- = A**-(P_i+'-(P_j)-)- \quad (3\text{-}7)$$

$$(A-(P_j)-)-(P_j)- = (A*^P-(P_j)-)*-(P_j)- = \atop A+'-(P_i*^P-(P_j)-)- = A-(P_i-(P_j)-)- \quad (3\text{-}8)$$

$$(A*^P-(P_j)-)*'-(P_j)- = (A**-(P_j)-)*^P-(P_j)- = \atop A+-(P_i*^P-(P_j)-)- = A*^P-(P_i**-(P_j)-)- \quad (3\text{-}9)$$

$$(A*^P-(P_j)-)++-(P_j)- = (A**-(P_j)-)+-(P_j)- = \atop A+-(P_i+-(P_j)-)- = A*^P-(P_i+'-(P_j)-)- \quad (3\text{-}10)$$

$$(A+-(P_j)-)*'-(P_j)- = (A+'-(P_j)-)*^P-(P_j)- = \atop A+-(P_i*'-(P_j)-)- = A*^P-(P_i*-(P_j)-)- \quad (3\text{-}11)$$

$$(A+-(P_j)-)++-(P_j)- = (A+'-(P_j)-)+-(P_j)- = \atop A+-(P_i++-(P_j)-)- = A*^P-(P_i+_P-(P_j)-)- \quad (3\text{-}12)$$

$$(A*'-(P_j)-)*'-(P_j)- = (A*-(P_j)-)*^P-(P_j)- = \atop A++-(P_i*^P-(P_j)-)- = A*'-(P_i**-(P_j)-)- \quad (3\text{-}13)$$

$$(A*'-(P_j)-)++-(P_j)- = (A*-(P_j)-)+-(P_j)- = \atop A++-(P_i+-(P_j)-)- = A*'-(P_i+'-(P_j)-)- \quad (3\text{-}14)$$

$$(A++-(P_j)-)*'-(P_j)- = (A+_P-(P_j)-)*^P-(P_j)- = \atop A++-(P_i*'-(P_j)-)- = A*'-(P_i*-(P_j)-)- \quad (3\text{-}15)$$

$$(A++-(P_j)-)++-(P_j)- = (A+_P-(P_j)-)+-(P_j)- = \atop A++-(P_i++-(P_j)-)- = A*'-(P_i+_P-(P_j)-)-. \quad (3\text{-}16)$$

17. The apparatus for communicating securely over an insecure communication medium set forth in claim 16 including:

alternative logical operations applicable to said complementations specified by $u_1 u_0$ and $v_1 v_0$ in said desegregator means can result in the same logical values due to Boolean algebra operations, these operations are

| logical operation | complementation specified by $u_1 u_0$ | complementation specified by $v_1 v_0$ |
|---|---|---|
| $A = I \cdot (A^{*\prime} + A^{++})$ | $\{X', X^P, X_P, I\}$ | $\{X^P, I, X', X_P\}$ |
| $A = I \cdot (A^{**} \cdot A^{+\prime})$ | $\{X_P, I, X', X^P\}$ | $\{X', X_P, X^P, I\}$ |
| $A = (A)' = (A^{*P} + A^{+})'$ | $\{X^P, X', I, X_P\}$ | $\{I, X^P, X_P, X'\}$ |
| $A = (A)' = (A^{*} \cdot A^{+})'$ | $\{I, X_P, X^P, X'\}$ | $\{X_P, X', I, X^P\}$ |
| $A = (A^P)^P = (A^{*\prime} + A^{+})^P$ | $\{X', X^P, X_P, I\}$ | $\{I, X^P, X_P, X'\}$ |
| $A = (A^P)^P = (A^{**} \cdot A^{+}_P)^P$ | $\{X_P, I, X', X^P\}$ | $\{X_P X', I, X^P\}$ |
| $A = (A_P)_P = (A^{*P} + A^{++})_P$ | $\{X^P, X', I, X_P\}$ | $\{X^P, I, X', X_P\}$ |
| or $A = (A_P)_P = (A^{*} \cdot A^{+\prime})_P$ | $\{I, X_P, X^P, X'\}$ | $\{X', X_P, X^P, I\}$. |

18. The apparatus for communicating securely over an insecure communication medium set forth in claim 16 including:

said parameters $P_i$, $P_j$ and $P_k$ are interchangeable, namely changing placed with each other.

* * * * *

UNITED STATES PATENT AND TRADEMARK OFFICE
CERTIFICATE OF CORRECTION

PATENT NO. : 4,703,503
DATED : October 27, 1987
INVENTOR(S) : Hitohisa Asai

It is certified that error appears in the above-identified patent and that said Letters Patent is hereby corrected as shown below:

In line 43 of col. 4 (the first raw of the table 1), "$A_p^+ \quad A^+ \quad A^{++}$" to read -- $A_p^+ \quad A^{+'} \quad A^{++}$ --.

In line 6 of col. 5, "$3/2 = 2^{n(lg3-)}$" to read -- $3^n = 2^{n(lg3)}$ --.

In line 51 of col. 5 (the 3rd term of eq. (2-3)), "$A^+ . A^{}$" to read -- $A_p^+ . A^{}$ --.

In line 68 of col. 6 (the 3rd term of eq. (3-3)), "$\{P_i^+ \ \{P_j \}$" to read -- $\{P_i \ \{P_j \}\}$ --.

In line 3 of col. 7 (the 3rd term of eq. (3-5)), "$A^+ \, '\{P_i^{++} \ \{P_j \}-$" to read -- $A^+ \, '\{P_i \ \{P_j^{++}\}\}$ --.

In line 3 of col. 9, "$A^+$" to read -- $A^{+'}$ --.

In line 45 of col. 9, "Accordingly to" to read -- According to --.

In line 51 of col. 9, "$P_r^{++} - P_s^*$" to read -- $P_r^{++} \ \{P_s^*$ --.

UNITED STATES PATENT AND TRADEMARK OFFICE
CERTIFICATE OF CORRECTION

PATENT NO. : 4,703,503
DATED : October 27, 1987
INVENTOR(S) : Hitohisa Asai

It is certified that error appears in the above-identified patent and that said Letters Patent is hereby corrected as shown below:

In line 9 of col. 10, "$A\{P_p\{P_i{}^{'+}\{P_j{}^{+}\_)\_)$" to read -- $A\{P_p{}^{+}\{P_i{}^{'}\{P_j{}^{+}\}\}$ --.

In line 11 of col. 10, "$P_i{}^{'}(\{P_j{}^{+}\}$" to read -- $P_i{}^{'}\{P_j{}^{+}\}$ --.

In line 21 of col. 10, "$A*\{P_i{}^{+'}P_j{}^{+}\}\}$" to read -- $A*\{P_p{}^{+}\{P_i{}^{'}\{P_j{}^{+}\}\}$ --.

In line 53 of col. 10, "bit" to read -- bits --.

In line 63 of col. 10, "pseudocompl-" to read -- pseudocomple- --.

In line 68 of col. 10, "proceduces" to read -- produces --.

In line 4 of col. 11, "are not in" to read -- are not used in --.

In line 23 of col. 11, "$A\{P_2{}^{*}\}P\text{-}$" to read -- $A\{P_2{}^{*}\{P\text{-}$ --.

In line 26 of col. 11, "10" bold face to read -- 10 --.

In line 27 of col. 11, "1" bold face to read -- 1 --.

In line 29 of col. 11, "$\ {}^{30}_p)\text{seudo}$" to read -- $\{P_p{}^{+}\text{pseudo}$ --.

UNITED STATES PATENT AND TRADEMARK OFFICE
CERTIFICATE OF CORRECTION

PATENT NO. : 4,703,503
DATED : October 27, 1987
INVENTOR(S) : Hitohisa Asai

Page 3 of 9

It is certified that error appears in the above-identified patent and that said Letters Patent is hereby corrected as shown below:

In line 42 of col. 11, "$A_p^+ \{P_1^+ \, ' \{P_1 \}\}$" to read --$A_p^+ \{P_1^+ \, ' \{P_2 \}\}$--.

In line 50 of col. 11, "pseudocomplement" to read -- pseudocomplements --.

In line 1 of col. 12, "$A_{\underline{p}}^+ \{P_2 \{P_1^* \}\}$" to read --$A_{\underline{p}}^+ \{P_2 \{P_1^* \}\}$--.

In line 12 of col. 12, "$A_{\underline{p}}^+$" to read -- $A_{\underline{p}}^+$ --.

In line 28 of col. 12, "$A\, -P_2^* \, -p_1^*$ --" to read --$A \{P_2^* \{P_1^* \}\}$--.

In line 33 of col. 12, "$A \{P_2^* \rightarrow P_1^* \}\}$" to read -- $A \{P_2^* \{P_1^* \}\}$ --.

In line 40 of col. 12, "$(A \{P_2^* \{P_1^* \}\}\,'$" to read --$(A \{P_2^* \{P_1^* \}\})'$ --.

In line 24 of col. 13 (the 2nd term of eq. (6-9)), "$(P_k \{P_p^+ \}_j)$" to read --$(P_i \{P_p^+ \}_j)$--.

UNITED STATES PATENT AND TRADEMARK OFFICE
CERTIFICATE OF CORRECTION

PATENT NO. : 4,703,503
DATED : October 27, 1987
INVENTOR(S) : Hitohisa Asai

It is certified that error appears in the above-identified patent and that said Letters Patent is hereby corrected as shown below:

In line 50 of col. 13, "eq.s (6) eq.s (3)" to read -- eq.s (6) and eq.s (3) --.

In line 61 of col. 13, the second "$P_1$" to read -- $P_i$ --.

In line 67 of col. 13, "$A-Q_1(P_1)-$ and $A-Q_2(Q_3)-$" to read -- $A+Q_1\{P_1\}+$ and $A+Q_2\{Q_3\}+$ --.

In line 6 of col. 14, "$(P_i^+ \{P_i\}^+)^{}$" to read -- $(P_i^+ \{P_j\}^+)^{}$ --.

In line 24 of col. 14, "$\{Q_1^* \, '\{P_1\}+\}$" to read -- $\{\underline{Q_1}^* \, '\{\underline{P_1}\}+\}$ --.

In line 25 of col. 14, " 13-" to read -- $+$ --.

In line 26 of col. 14, "$q_3$" to read -- $Q_3$ --.

In line 28 of col. 14, "$Q_1^* \, '-P_1-$" to read -- $Q_1^* \, '\{P_1\}+$ --.

In line 29 of col. 14, "$Q_2^{}-Q_3-$" to read -- $Q_2^{} \{Q_3\}+$ --.

In line 57 of col. 14, "$P_i^{*p}-P_k-$" to read -- $P_i^{*p} \{P_k\}+$ --.

In line 40 of col. 15, "$A^+$" to read -- $\underline{A}^+$ --.

UNITED STATES PATENT AND TRADEMARK OFFICE
CERTIFICATE OF CORRECTION

PATENT NO. : 4,703,503

DATED : October 27, 1987

INVENTOR(S) : Hitohisa Asai

Page 5 of 9

It is certified that error appears in the above-identified patent and that said Letters Patent is hereby corrected as shown below:

In line 41 of col. 15, "$=A^*$" to read $--=\underline{A}^*--$.

In line 43 of col. 15, "1 (on) and 0" bold face to read -- 1 (on) and 0 --.

In line 46 of col. 15, "$A(Q_2^+ -Q_3^{})$" to read -- $A(Q_2^+(Q_3^{}))$ --.

In line 61 of col. 15, "don;t" to read -- don't --.

In line 66 of col. 15, "$Q_2^{} -Q_3 -$" to read -- $Q_2^{}(Q_3)$ --.

In line 60 of col. 16, "$0^+$" to read $\#\#)^+\#\#$.

In line 66 Of col. 16, "$(P_1-)^p$" to read -- $(P_1)^p$ --.

In line 1 of col. 17, "$-)_3'$" to read -- $)_3'$ --.

In line 5 of col. 17, "$A -Q_1 -$ and $A -Q_2^* -$" to read -- $A(Q_1^+)$ and $A(Q_2^*)$ --.

In line 57 of col. 17, "$A'0^+$" to read -- $A')^+$ --.

In line 58 of col. 17, "$,A^*',$" to read -- $,(A^*',$ --.

In line 46 of col. 18, "$P_j 13$" to read-- $P_j$ ) --.

UNITED STATES PATENT AND TRADEMARK OFFICE
CERTIFICATE OF CORRECTION

PATENT NO. : 4,703,503
DATED : October 27, 1987
INVENTOR(S) : Hitohisa Asai

It is certified that error appears in the above-identified patent and that said Letters Patent is hereby corrected as shown below:

In line 2 of col 19 (the 2nd term of eq. (3-2)), "$\{P_j -$" to read -- $\{P_j\}$ --.

In line 3 of col. 19 (the 3rd term of eq. (3-3)), "$\{P_i^+ \{P_j\}$" to read -- $\{P_i^+ \{P_j\}\}$ --.

In line 5 of col. 19 (the 3rd term of eq. (3-5)), "$\{P_i^{++} \{P_j\}-$" to read -- $\{P_i^{++} \{P_j\}\}$ --.

In line 29 of col. 21, "$\gamma X'$" to read -- $\{X'$ --.

In line 8 of col. 23, "ssaid" to read -- said --.

In line 1 of col. 24, "ssaid" to read -- said --.

In line 33 of col. 24 (the 2nd term of eq. (3-2)), "$\{P_j -=$" to read -- $\{P_j\}=$ --.

In line 37 of col. 24 (thr 3rd term of eq. (3-3)), "$\{P_i^+ \{P_j\}=$" to read -- $\{P_i^+ \{P_j\}\} =$ --.

In line 40 of col. 24 (the 3rd term of eq. (3-5)), "$\{P_i^{++} \{P_j\}-$" to read -- $\{P_i^{++} \{P_j\}\}$ --.

UNITED STATES PATENT AND TRADEMARK OFFICE
CERTIFICATE OF CORRECTION

PATENT NO. : 4,703,503
DATED : October 27, 1987
INVENTOR(S) : Hitohisa Asai

It is certified that error appears in the above-identified patent and that said Letters Patent is hereby corrected as shown below:

In line 53 of col 24 (the 3rd term of eq. (3-10)), "$P_i^{+-}(p_j\}$" to read --$P_i^{+}\{P_j\}$--.

In line 57 of col. 24 (the 1st term of eq. (3-12)), "$^{++-}(p_j\}$" to read --$^{++}\{P_j\}$--.

In line 65 of col. 24 (the 3rd term of eq. (3-15)), "$A_i^{++-}(p_j\,'\{P\}\}=$" to read --$A_i^{++}\{P_j^{*}\,'\{P\}\}=$--.

In line 17 of col. 25, "$IX^p\}$" to read -- $I,X^p\}$ --.

In line 18 of col. 25, "$X\ I\}$" to read -- $X_p\,,I\}$ --.

In line 18 of col. 25, "$\{I,,X^p$" to read -- $\{I,X^P$ --.

In line 54 of col. 25 (the 2nd term of eq. (6-1)), "$P\ \}\}$" to read --$P_k\}\}$--.

In line 54 of col. 25 (the 3rd term of eq. (6-1)), "$_-(p_i\}$" to read --$\{P_i\}$--.

In line 5 of col. 26 (the 3rd term of eq. (6-6)), "$^{++-}(P_i\}$" to read --$^{++}\{P_i\}$--.

UNITED STATES PATENT AND TRADEMARK OFFICE
CERTIFICATE OF CORRECTION

PATENT NO. : 4,703,503
DATED : October 27, 1987
INVENTOR(S) : Hitohisa Asai

It is certified that error appears in the above-identified patent and that said Letters Patent is hereby corrected as shown below:

In line 15 of col. 26 (the 2nd term of eq. (6-9)), "$(P_k^+ \{P_p^{++}\})$" to read --$(P_i^+ \{P_p^{++}\})_j$--.

In line 52 of col. 26, "the third term of the fourth term" to read --the third term or the fourth term--.

In line 7 of col. 27 (the 3rd term of eq. (3-7)), "P hu+" to read --$P_i^+$--.

In line 10 of col. 27 (the 3rd term of eq. (3-10)), "$P_i^{+\_} (p_j^+ \}$" to read --$P_i^+ \{P_j^+\}$--.

In line 12 of col. 27 (the 1st term of eq. 3-12)), "$P_i^{++\_}\}) (p_j^+$" to read -- $P_i^{++}\}) \{P_j^+\}$ --.

In line 15 of col. 27 (the 3rd term of eq. (3-15)), "$A^{++\_} (p_i^{*}\}$" to read $A^{++} \{P_i^{*}\}$ --.

In line 32 of col. 27, "storing said" to read -- and storing said --.

In line 66 of col. 28 (the 3rd term of eq. (6-1)), "$P_k^{*}\}'(p_i^{*}\}$" to read -- $P_k^{*}\}'\{P_i^{*}\}$ --.

UNITED STATES PATENT AND TRADEMARK OFFICE
CERTIFICATE OF CORRECTION

PATENT NO. : 4,703,503
DATED : October 27, 1987
INVENTOR(S) : Hitohisa Asai

It is certified that error appears in the above-identified patent and that said Letters Patent is hereby corrected as shown below:

In line 17 of col. 29 (the 3rd term of eq. (6-6)), $"^{-}(P_i^{++}\}"$ to read $--\{P_i^{++}\}--$.

In line 24 of col. 32 (the 3rd term of eq. (3-10)), $"P_i^{+}\ ^{-}(p_j^{+}\}"$ to read $--P_i^{+}\{P_j\}--$.

In line 29 of col. 32 (the 1st term of eq. (3-12)), $")^{++}\ ^{-}(p_j^{+}"$ to read $--)\{P_j^{++}\}--$.

In line 36 of col. 32 (the 3rd term of eq. (3-15)), $"A^{++}\ ^{-}(p_i"$ to read $--A\{P_i^{++}\}--$.

Signed and Sealed this

Eleventh Day of July, 1989

DONALD J. QUIGG

Commissioner of Patents and Trademarks